US010218487B2

(12) United States Patent
Min et al.

(10) Patent No.: US 10,218,487 B2
(45) Date of Patent: Feb. 26, 2019

(54) RADIO CONFIGURATION OPTIMIZATION FOR FULL-DUPLEX COMMUNICATIONS

(71) Applicant: Intel Corporation, Santa Clara, CA (US)

(72) Inventors: Alexander W. Min, Portland, OR (US); Minyoung Park, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 289 days.

(21) Appl. No.: 14/977,373

(22) Filed: Dec. 21, 2015

(65) Prior Publication Data

US 2017/0180103 A1 Jun. 22, 2017

(51) Int. Cl.
*H04L 5/00* (2006.01)
*H04L 5/14* (2006.01)
*H04W 52/24* (2009.01)

(52) U.S. Cl.
CPC .............. *H04L 5/0073* (2013.01); *H04L 5/14* (2013.01); *H04W 52/243* (2013.01)

(58) Field of Classification Search
CPC ....... H04L 5/0073; H04L 5/14; H04W 52/243
See application file for complete search history.

(56) References Cited

U.S. PATENT DOCUMENTS

| | | | |
|---|---|---|---|
| 9,258,098 B2* | 2/2016 | Thubert | ................ H04L 5/0055 |
| 2009/0290516 A1* | 11/2009 | Han | ..................... H03G 3/3068 |
| | | | 370/277 |
| 2013/0223294 A1* | 8/2013 | Karjalainen | .............. H04L 5/14 |
| | | | 370/277 |
| 2015/0016309 A1* | 1/2015 | Fang | ......................... H04L 5/14 |
| | | | 370/277 |
| 2015/0071062 A1* | 3/2015 | Cheng | .................. H04B 7/0689 |
| | | | 370/230 |

(Continued)

FOREIGN PATENT DOCUMENTS

| | | |
|---|---|---|
| CN | 103619072 A | 3/2014 |
| WO | WO-2013179270 A1 | 12/2013 |

OTHER PUBLICATIONS

"International Application Serial No. PCT/US2016/063045, International Search Report dated Mar. 3, 2017", 3 pgs.

(Continued)

*Primary Examiner* — Ivan O Latorre
(74) *Attorney, Agent, or Firm* — Schwegman Lundberg & Woessner, P.A.

(57) ABSTRACT

A full duplex communication system transmits a first message from a first radio to a second radio and a second message from the second radio to the first radio, in full duplex transmission, and collaboratively and dynamically adjusts the radio configurations of the first and second radios to transmit the first message and transmit the second message to completion in substantially the same time. Alternatively the system operates a first, a second and a third radio in full duplex mode, wherein the first radio transmits a first message having a first message length to the second radio, and the second radio transmits a second message having a second message length to the third radio; and collaboratively and dynamically adjusts the radio configuration of at least one of the first and second radios, to transmit the first message and transmit the second message to completion at substantially the same time.

20 Claims, 19 Drawing Sheets

(56) References Cited

U.S. PATENT DOCUMENTS

| | | | |
|---|---|---|---|
| 2015/0071270 A1 | 3/2015 | Harel et al. | |
| 2015/0117269 A1* | 4/2015 | Navalekar | H04L 5/143 370/277 |
| 2015/0146654 A1* | 5/2015 | Chu | H04W 72/1289 370/329 |
| 2015/0172038 A1 | 6/2015 | Jiang et al. | |
| 2015/0195079 A1* | 7/2015 | Gong | H04L 5/1415 370/277 |
| 2015/0244505 A1* | 8/2015 | Celebi | H04W 52/36 370/277 |
| 2015/0282043 A1* | 10/2015 | Fang | H04W 52/241 370/329 |
| 2015/0333894 A1* | 11/2015 | Wang | H04L 5/0073 370/329 |
| 2016/0219441 A1* | 7/2016 | Park | H04W 74/0816 |
| 2016/0277160 A1* | 9/2016 | Lim | H04L 5/006 |
| 2016/0315754 A1* | 10/2016 | Wu | H04L 5/1461 |
| 2016/0330726 A1* | 11/2016 | Li | H04L 5/14 |
| 2017/0026162 A1* | 1/2017 | Nabetani | H04L 1/12 |
| 2017/0041118 A1* | 2/2017 | Liu | H04L 5/14 |
| 2017/0055259 A1* | 2/2017 | Valliappan | H04L 5/1469 |
| 2017/0265096 A1* | 9/2017 | Goto | H04J 11/00 |
| 2017/0302337 A1* | 10/2017 | Liu | H04B 7/005 |
| 2018/0048455 A1* | 2/2018 | Lim | H04B 17/345 |

OTHER PUBLICATIONS

"International Application Serial No. PCT/US2016/063045, Written Opinion dated Mar. 3, 2017", 7 pgs.
Karaputugala, Madushan Thilina, et al., "Medium access control design for full duplex wireless systems; challenges and approaches", IEEE Communications Magazine (vol. 53, Issue: 5 ), (May 14, 2015), 112-120.

* cited by examiner

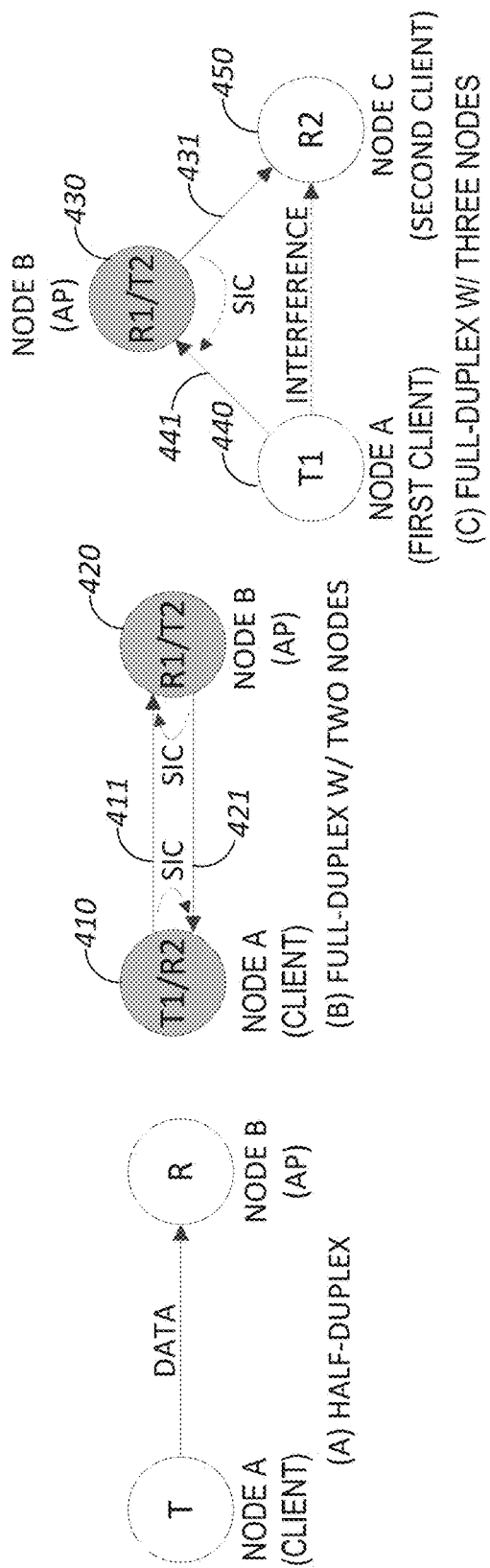

US 10,218,487 B2

RADIO CONFIGURATION OPTIMIZATION FOR FULL-DUPLEX COMMUNICATIONS

TECHNICAL FIELD

Some embodiments relate to wireless devices. Some embodiments relate to Institute of Electrical and Electronics Engineers (IEEE) 802.11. Some embodiments relate to IEEE 802.11. Some embodiments relate to optimized full duplex (FD) communications. Some embodiments relate to optimized FD in a two node configuration. Some embodiments relate to optimized FD communication in a three node configuration.

BACKGROUND

Wireless spectrum has become a scarce resource due to the recent increase in mobile applications and services, rendering an efficient use of available wireless spectrum critical to sustain the ever-increasing mobile traffic. However, most conventional wireless radios operate in a half-duplex (HD) manner (for single channel operation), i.e., either transmit or receive at any given time, due to the lack of ability to mitigate self-interference (i.e., interference caused by its transmit (TX) signal to its receive (RX) signal processing chain), hence reducing spectrum efficiency significantly compared to a "full-duplex" (FD) operation.

BRIEF DESCRIPTION OF THE DRAWINGS

FIG. 4A illustrates half duplex operations;

FIG. 4B illustrates full duplex operation with two nodes.

FIG. 4C illustrates full duplex operation with three nodes.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
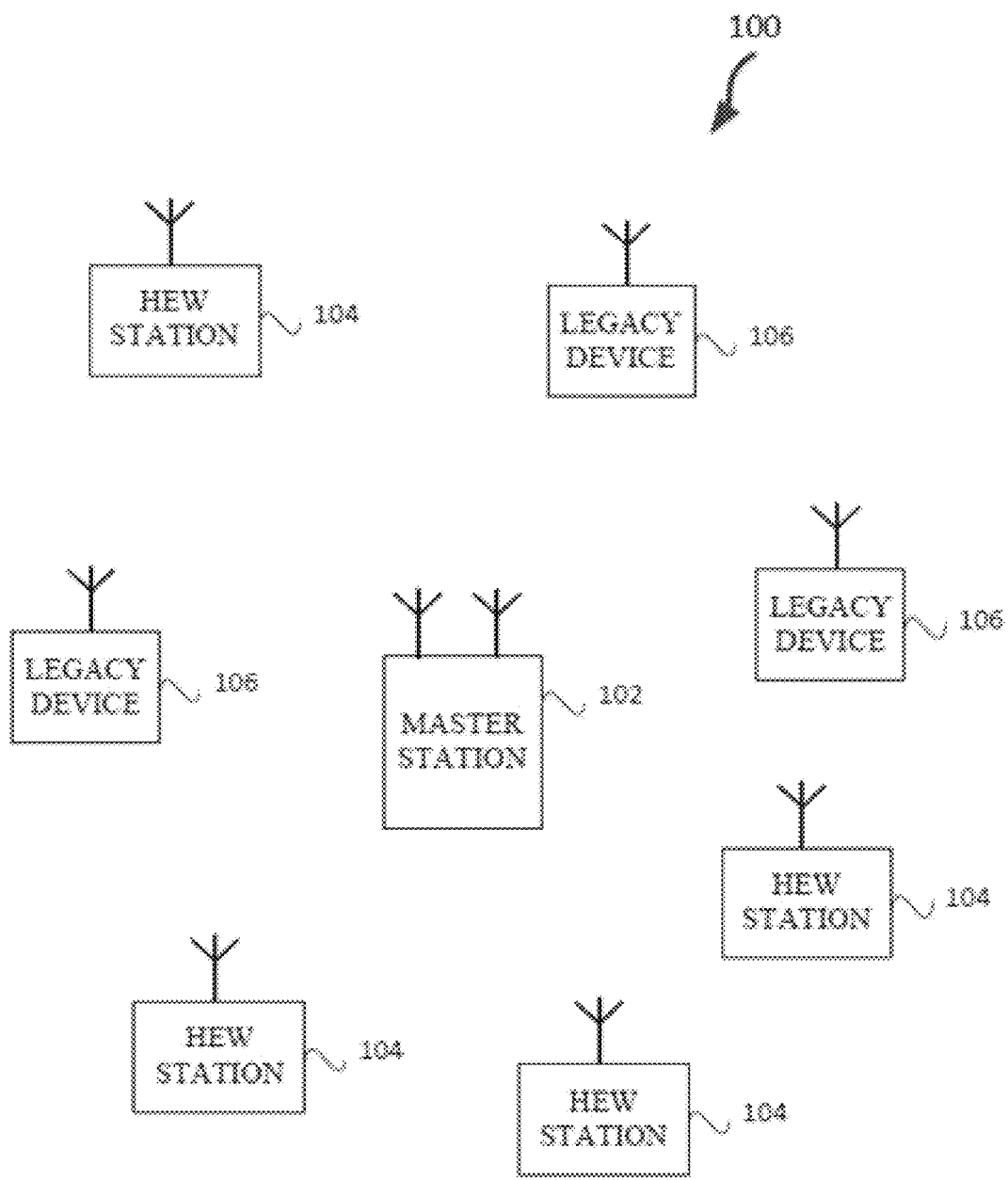
FIG. 1 illustrates a wireless network in accordance with some embodiments.

FIG. 1 illustrates a WLAN 100 in accordance with some embodiments. The WLAN may comprise a basic service set (BSS) 100 that may include a master station 102, which may be an access point (AP), a plurality of high-efficiency WLAN (HEW) (e.g., IEEE 802.1 lax) STAs 104 and a plurality of legacy (e.g., IEEE 802.11n/ac) devices 106.

The master station 102 may be an AP using the IEEE 802.11 to transmit and receive. The master station 102 may be a base station. The master station 102 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may) include a multiple access technique. For example, the IEEE 802.11 protocol may include space-division multiple access (SDMA) and/or multiple-user multiple-input multiple-output (MU-MIMO).

The legacy devices 106 may operate in accordance with one or more of IEEE 802.11 a/b/g/n/ac/ad/af/ah/aj, or another legacy wireless communication standard. The legacy devices 106 may be STAs or IEEE STAs. The HEW STAs 104 may be wireless transmit and receive devices such as cellular telephone, smart telephone, handheld wireless device, wireless glasses, wireless watch, wireless personal device, tablet, or another device that may be transmitting and receiving using the IEEE 802.11 protocol such as IEEE 802.11 ax or another wireless protocol. In some embodiments, the HEW STAs 104 may be termed high efficiency (HE) stations.

The master station 102 may communicate with legacy devices 106 in accordance with legacy IEEE 802.11 communication techniques. In example embodiments, the master station 102 may also be configured to communicate with HEW STAs 104 in accordance with legacy IEEE 802.11 communication techniques.

In some embodiments, a HEW frame may be configurable to have the same bandwidth as a subchannel. The bandwidth of a subchannel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a subchannel may be 1 MHz, 1.25 MHz, 2.03 MHz, 2.5 MHz, 5 MHz and 10 MHz, or a combination thereof or another bandwidth that is less or equal to the available bandwidth may also be used. In some embodiments the bandwidth of the subchannels may be based on a number of active subcarriers. In some embodiments the bandwidth of the subchannels are multiples of 26 (e.g., 26, 52, 104, etc.) active subcarriers or tones that are spaced by 20 MHz. In some embodiments the bandwidth of the subchannels is 256 tones spaced by 20 MHz. In some embodiments the subchannels are multiple of 26 tones or a multiple of 20 MHz. In some embodiments a 20 MHz subchannel may comprise 256 tones for a 256 point Fast Fourier Transform (FFT).

A HEW frame may be configured for transmitting a number of spatial streams, which may be in accordance with MU-MIMO. In other embodiments, the master station 102, HEW STA 104, and/or legacy device 106 may also implement different technologies such as code division multiple access (CDMA) 2000, CDMA 2000 1×, CDMA 2000 Evolution-Data Optimized (EV-DO), Interim Standard 2000 (IS-2000). Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HEW communications. In accordance with some IEEE 802.11ax embodiments, a master station 102 may operate as a master station which may be arranged to contend for a wireless medium (e.g., during a contention period) to receive exclusive control of the medium for an HEW control period. In some embodiments, the HEW control period may be termed a transmission opportunity (TXOP). The master station 102 may transmit a HEW master-sync transmission, which may be a trigger frame or HEW control and schedule transmission, at the beginning of the HEW control period. The master station 102 may transmit a time duration of the TXOP and subchannel information. During the HEW control period, HEW STAs 104 may communicate with the master station 102 in accordance with a non-contention based multiple access technique such as OFDMA or MU-MIMO. This is unlike conventional WLAN communications in which devices communicate in accordance with a contention-based communication technique, rather than a multiple access technique. During the HEW control period, the master station 102 may communicate with HEW stations 104 using one or more HEW frames. During the HEW control period, the HEW STAs 104 may operate on a sub-channel smaller than the operating range of the master station 102. During the HEW control period, legacy stations refrain from communicating.

In accordance with some embodiments, during the master-sync transmission the HEW STAs 104 may contend for the wireless medium with the legacy devices 106 being excluded from contending for the wireless medium during the master-sync transmission. In some embodiments the trigger frame may indicate an uplink (UL) UL-MU-MIMO and/or UL OFDMA control period.

In some embodiments, the multiple-access technique used during the HEW control period may be a scheduled OFDMA technique, although this is not a requirement. In some embodiments, the multiple access technique may be a time-division multiple access (TDMA) technique or a frequency-division multiple access (FDMA) technique. In some embodiments, the multiple access technique may be a space-division multiple access (SDMA) technique.

The master station 102 may also communicate with legacy stations 106 and/or HEW stations 104 in accordance with legacy IEEE 802.11 communication techniques. In some embodiments, the master station 102 may also be configurable to communicate with HEW stations 104 outside the HEW control period in accordance with legacy IEEE 802.11 communication techniques, although this is not a requirement.

In example embodiments, the HEW device 104 and/or the master station 102 are configured to perform the methods and functions herein described in conjunction with FIGS. 1-8.

Figure 2:
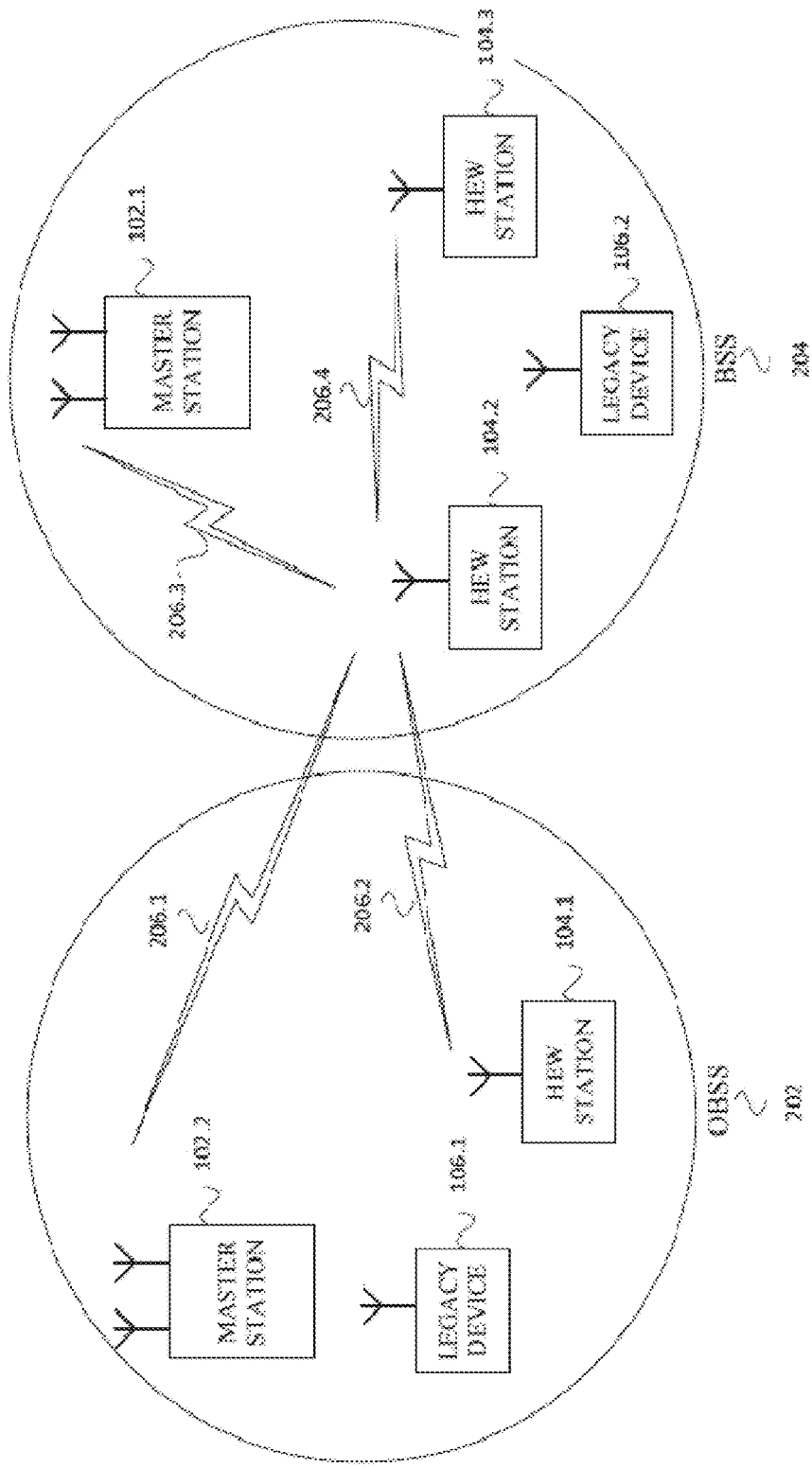
FIG. 2 illustrates a basic service set (BSS) and an overlapping basic service set (OBSS) in accordance with some embodiments.

FIG. 2 illustrates a basic service set (BSS) 204 and an overlapping basic service set (OBSS) 202 in accordance with some embodiments. Illustrated in FIG. 2 are an OBSS 202 and BSS 204. The OBSS 202 includes one or more master stations 102, one or more HEW stations 104, and one or more legacy devices 108. The HEW station 104.1 and legacy device 106.1 are associated with the master station 102.2. The master station 102.2 has an identification (not illustrated) for the OBSS 202, which may be termed a BSS identification (BSSID). In some embodiments, the identification is termed the color of the OBSS 202. The HEW station 104.1 stores a MAC address (see FIGS. 3, 4, and 5) of the master station 102.2. The OBSS 202 is a BSS 100. The OBSS 202 is termed an OBSS 202 to BSS 204 because some of the signals 206 overlap with the BSS 204.

The BSS 204 includes one or more master stations 102, one or more HEW stations 104.2, 104.3, and one or more legacy devices 106.2. The HEW stations 104.2 and 104.3 and legacy device 106.1 are associated with the master station 102.1. The master station 102.1 has an identification (not illustrated) for the BSS 204, which may be termed a BSSID. In some embodiments, the identification is termed the color of the BSS 204. The HEW stations 104.2 and 104.3 store a MAC address (see FIGS. 3, 4, and 5) of the master station 102.1.

Signal 206.1 is transmitted from the master station 102.2 and received by HEW station 104.2. Signal 206.2 is transmitted from HEW station 104.1 and received by HEW station 104.2. Signal 206.4 is transmitted from the HEW station 104.3 and received by HEW station 104.2. Signal 206.3 is transmitted by master station 102.1 and received by HEW station 104.2. The signals 206 may be packets transmitted by a master station 102, HEW station 104, legacy device 106, and/or another wireless device (not illustrated).

In some embodiments the HEW station 104 and/or master station 102 are configured to determine whether or not to use spatial re-use based on whether a signal 206 is from an OBSS 202 or BSS 204. The HEW station 104 determines whether the detected frame is an inter-BSS (OBSS 204, signals 206.1 and 206.2) or intra-BSS frame (BSS 204, signals 206.3 and 206.4) by using BSS color, which may be indicated in a physical header (e.g., SIG-A) or MAC address in the MAC header. If the detected frame is a inter BSS frame, under predetermined conditions, the HEW station 104 uses a predetermined a power detect level of the OBSS 202 that is greater than the minimum receive sensitivity level to determine whether or not the HEW station 104 may perform an action such as spatially reuse the resource the frame is using.

For example, HEW station 104.2 may receive signal 206.2 and if the signal is below a predetermined power detect level for OBSS 202, then the HEW station 104.2 may transmit a frame that overlaps the time signal 206.2 is transmitted and may use the same or an overlapping subchannel as signal 206.2. The HEW stations 104 store the MAC address of the master stations 102.

There may be a technical problem of determining whether a packet is transmitted from a master station 102, HEW station 104, or legacy device 106 from an OBSS 202 or a BSS 204. Additionally, the HEW station 104 may not be able to determine whether a packet is transmitted from a master station 102, a HEW station 104, or legacy device 106. In some embodiments the color or BSSID is included in the packets.

Figure 3A:
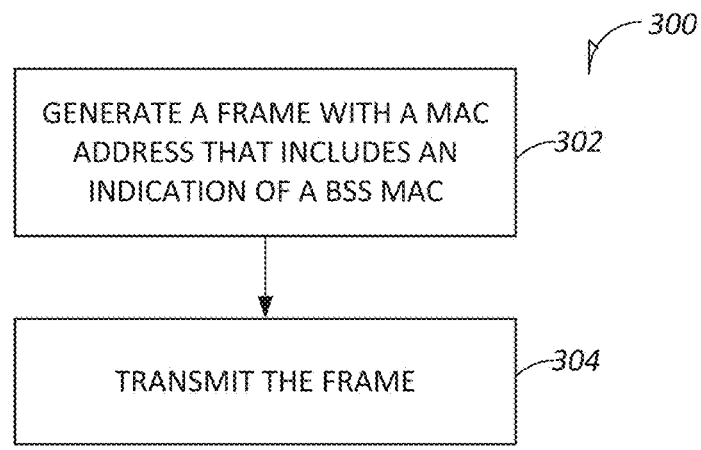
FIG. 3A illustrates a method of generating a frame with a MAC address that includes an indication of a BSS in accordance with some embodiments.

FIG. 3A illustrates a method 300 of generating a frame with a MAC address that includes an indication of a BSS in accordance with some embodiments. FIG. 3A is disclosed in conjunction with FIG. 3B-3D.

Figure 5A:
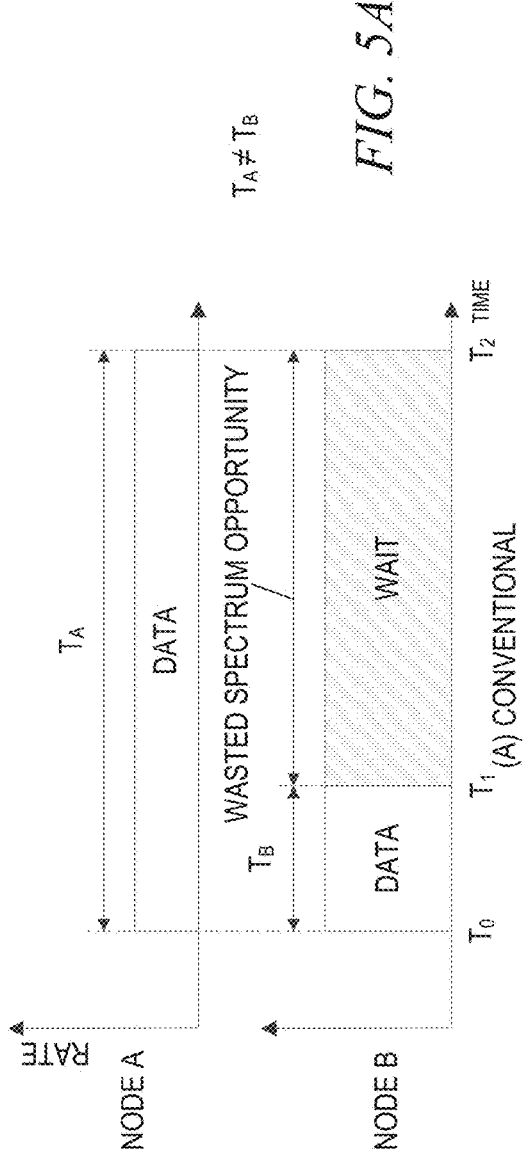
FIG. 5A illustrates conventional full duplex communication between two nodes.

In some embodiments, the master station 102 generates a MAC address for the master station 102 that indicates the address is for a master station 102. For example, FIGS. 5 and 6 illustrate example embodiments where the MAC address indicates a MAC address is from a master station 102. This may be an indication of the BSS. For example, the HEW station 104 may then determine whether the frame is from the BSS the HEW station 104 is associated or an OBSS by comparing the MAC address with the address of the master station 102 the HEW station 104 is associated with. The master station 102 may set a locally administered bit in the MAC address to one to indicate that the master station 102 generated the MAC address.

Figure 3B:
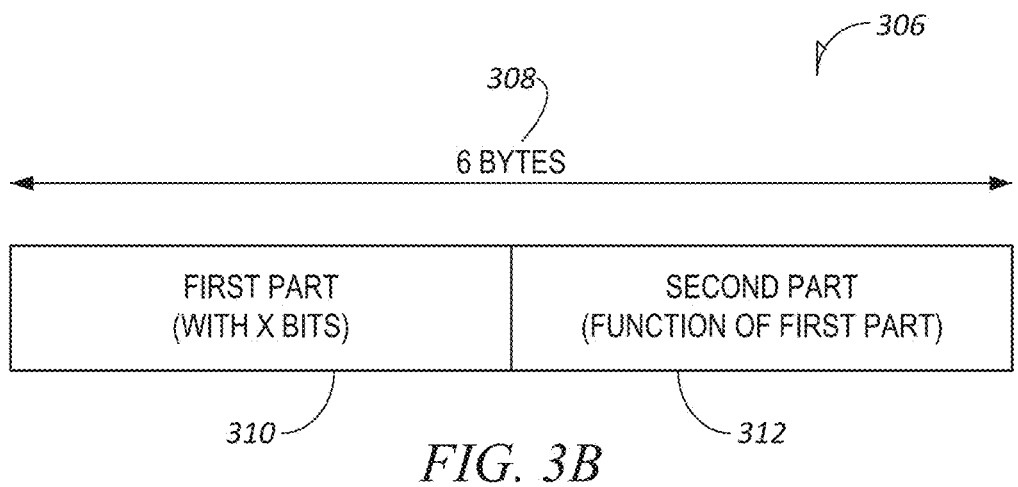
FIG. 3B illustrates an indication that a MAC address is for a master station in accordance with some embodiments.

FIG. 3B illustrates an indication that a MAC address 306 is for a master station in accordance with some embodiments. The MAC address 306 is six bytes 308 in accordance with some embodiments. The MAC address 306 includes a first part 310 with X bits and a second part 312 that is a function of the first part 310. For example, the second part 312 may be a CRC of the first part 310. In other embodiments, the second part 312 is generated by a predetermined formula of the first part 310. A HEW station 104 may determine that the MAC address 306 is that of a master station 102 if the CRC of the first part 310 matches the second part 312. The first part 310 will guarantee uniqueness for the MAC address 306 used by master station 102 for the BSS. The number of bits X is a predetermined number. There are $2^X$ number of MAC addresses 306 that can be used by the master station 102. Further, the probability for a master station 102, HEW station 104, or legacy device 106 to have a MAC address with this format is $2^X/2^{48}$. When X is not too large, say 24, the probability is small, i.e., 0.000006%.

Figure 3C:
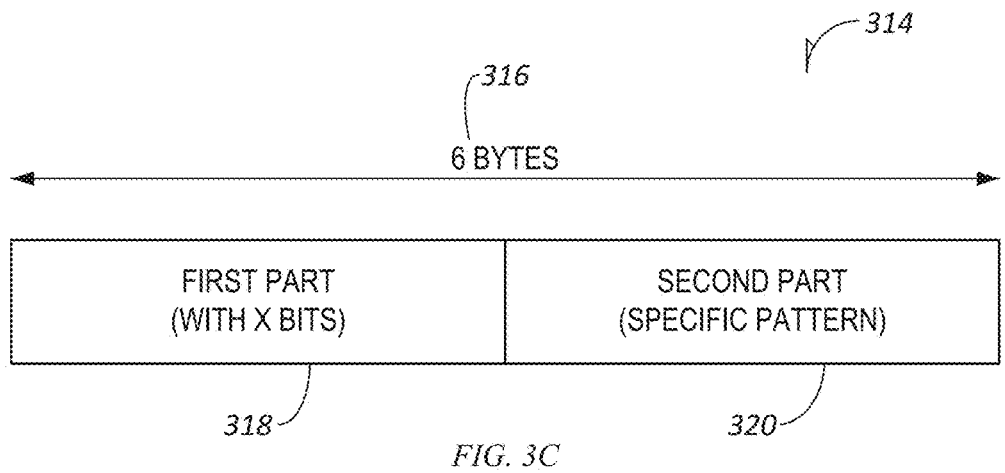
FIG. 3C illustrates an indication that a MAC address is for a master station in accordance with some embodiments.

FIG. 3C illustrates an indication that a MAC address 314 is for a master station in accordance with some embodiments. The MAC address 314 is 6 bytes 316 in accordance with some embodiments. The MAC address 314 includes a first part 318 with X bits and a second part 320 that is a predetermined pattern. A HEW station 104 determines whether the MAC address 314 is of a master station 102 by comparing the second part 320 to a specific pattern (e.g., all ones). The probability for a master station 102, HEW station 104, or legacy device 106 to have a MAC address with this format is the same as determined for FIG. 3B.

In some embodiments, if there is only one address in the frame such as a CTS frame and the address is to a master station 102, then the MAC address may have an individual/group bit set to one to indicate the MAC address is of a master station 102. The HEW station 104 may receive the CTS frame and determine the MAC address is of a master station 102 based on the individual/group bit being set to 1. The individual/group bit is then zeroed out to compare the MAC address in the CTS frame with the address of the master station 102 the HEW station 104 is associated with. The HEW station 104 can then determine if the CTS frame was transmitted from the BSS or an OBSS. The HEW stations 104 and/or legacy devices 106 are configured to not treat the MAC address with the individual/group bit set to 1 as a group frame in accordance with some embodiments.

Figure 3D:
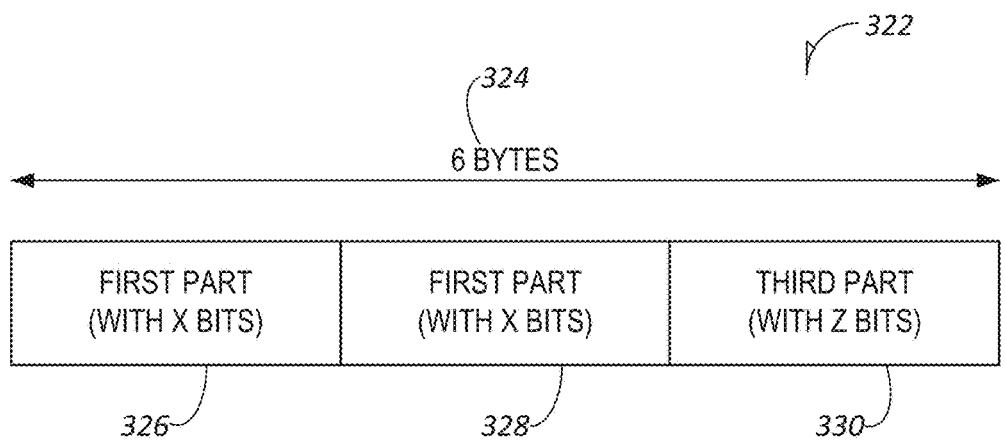
FIG. 3D illustrates a MAC address that includes an indication of a BSS in accordance with some embodiments

FIG. 3D illustrates a MAC address 322 that includes an indication of a BSS in accordance with some embodiments. Illustrated in FIG. 3D is a first part 326, second part 328, and third part 330. The MAC address 322 is six bytes 324 in accordance with some embodiments. The first part 326 is used for uniqueness for the MAC address 322 with other neighborhood MAC addresses. The second part 328 indicates a color of the BSS or a BSSID. The third part 330 indicates that the MAC address 322 is an IEEE 802.11ax MAC address 322. The third part 330 may be the CRC of the first two parts or a specific pattern to indicate IEEE 802.11ax MAC address. A master station 102 and/or HEW station 104 may be configured to receive the MAC address 322 and use the third part 330 to see if the MAC address 322 is an IEEE 802.11ax MAC address 322. The master station 102 and/or HEW station 104 can then determine the BSS color or BSSID using the second part 328.

The master station 102 and/or HEW station 104 may then determine whether or not the color or BSSID is an intra BSS packet or an inter BSS packet (e.g., from a OBSS). The HEW station 104 stores the color or BSSID of the master station 102 the HEW station 104 is associated with. In some embodiments, X is 24 bits, Y is 8 bits, and Z is 16 bits. Using this example, the probability of a legacy device 106 to choose an IEEE 802.11ax MAC address 322 is $\frac{1}{2}^{(16)}$. A neighborhood can sustain $2^{24}$ MAC address, and there are 8 bits for color. In accordance with the MAC address 322 every MAC address 322 indicates BSSID or color, and it is not limited to the MAC address of the master station 102.

In some embodiments, a master station 102 and/or HEW station 104 choose whether to use the specific MAC address 306, 314, 322, or not. In some embodiments, the master station 102 may signal to the HEW station 104 the type of MAC address 306, 314, 322 to use during association with the master station 102.

The method 300 of FIG. 3A may continue at operation 304 with transmitting the frame. The method 300 may end.

Full Duplex Communication

Full duplex (FD) radio (or communication) is a promising technology that can significantly improve spectrum efficiency by allowing wireless radios/devices to simultaneously transmit and receive radio frequency (RF) signals on the same frequency channel. FD became feasible only recently thanks to the advances in analog/digital self-interference cancellation (SIC) technologies.

FIGS. 4A-4C illustrate wireless communication scenarios with half duplex (HD) vs. FD radio operations. FIG. 4A illustrates HD operations. In HD operation, each radio operates as either a transmitter (denoted as "T" in the drawing) or a receiver (denoted as "R" in the drawing) at any given time. On the other hand, FD radios can transmit and receive on the same channel simultaneously.

FIGS. 4B-4C illustrate FD radios, which can transmit and receive on the same channel simultaneously. In the figure, the nodes 410, 420, 430 are operating in FD mode. FIG. 4B illustrates full duplex operation with two nodes. Node A and Node B exchange data in FD mode. In this scenario, the receivers R1 (Node B), 420, and R2 (node) 410, can successfully decode their received signals by canceling self-interference caused by their co-located transmitters T2 420 and T1 410 using self-interference cancellation (SIC) technologies implemented in their analog RF circuitry and digital signal processing.

FIG. 4C illustrates full duplex operation with three nodes. Here node A, 440, Node B, 430, and Node C, 450, are involved in FD communications. For example, Node B can be an access point (AP) in 802.11 WLAN, and Node A and Node C can be client devices. In this scenario, Node B (AP) has data to send to Node C (downlink), and Node A has data to Node B (uplink), hence two FD communication links can be established simultaneously, i.e., T1 (A) R1 (B) and T2(B) R2(C) by leveraging Node B (AP)'s SIC capability. While R1 (Node B) can cancel self-interference caused by T2, R2 (Node C) may suffer from inter-node interference from T1 (A) R2(C).

Most existing wireless medium access control (MAC) protocols are designed and optimized for HD communication scenarios (e.g., 802.11 WLAN), and may not be suitable (or directly applicable) for FD communications. To fully benefit from FD capability, a new MAC-layer approach that cooperatively learns or determines the RF environment and dynamically optimizes radio configuration to maximize spectrum efficiency for FD communication scenarios is proposed.

To illustrate the problem, consider a simple FD communication scenario between the two nodes in FIG. 4B. FIG. 5A illustrates conventional full duplex communication between two nodes. Assume that Node A and Node B have data to transmit to each other, and both start transmitting data at $T_0$, as shown in FIG. 5A (Note that the figure illustrates only the data transmission part to deliver the key idea without losing focus. As shown in FIG. 5A, the data transmission may take different amounts of time (i.e., $T_A$, $T_B$) due to various reasons, such as asymmetric traffic characteristics (e.g., different data packet sizes for uplink/downlink), different SIC capability, interference, etc. In FIG. 5A, assume that Node B's message is shorter than Node A's message, and, as a result, Node B completes data transmission earlier than Node A (e.g., at $T_1$ and $T_2$). This results in a waste of spectrum resources because Node B has to wait until Node A completes its data transmission for the time duration of $(T_1, T_2)$. Node B or other neighboring nodes cannot attempt to capture/reuse this spectrum opportunity for $(T_1, T_2)$.

Figure 5B:
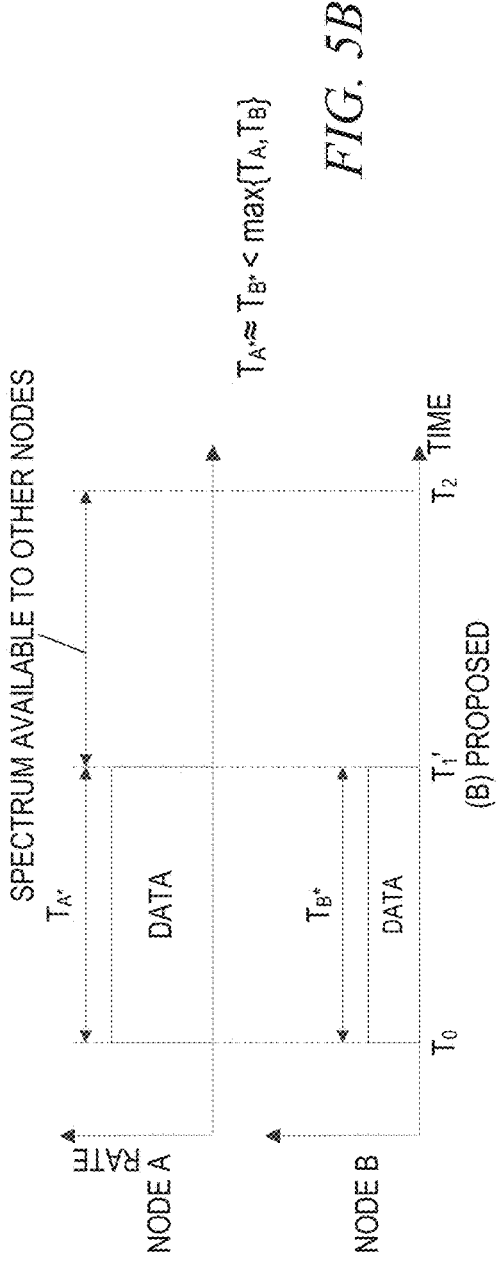
FIG. 5B is illustrates full duplex communication between two nodes, optimized in accordance with some embodiments.
Figure 6:
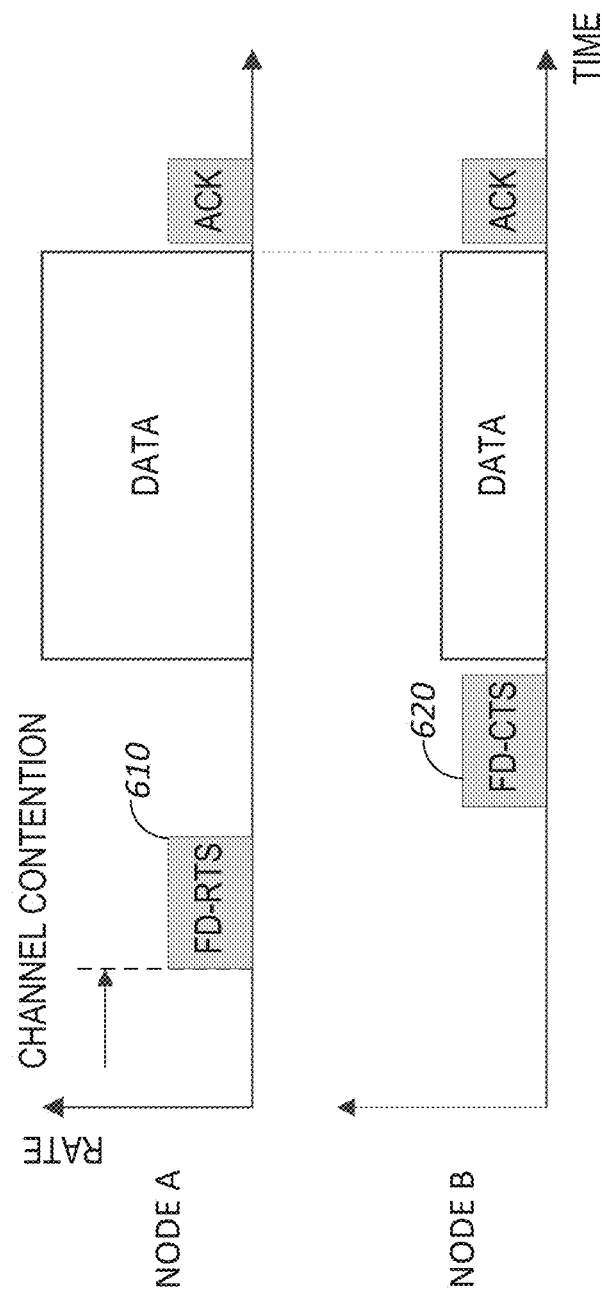
FIG. 6 illustrates full duplex communication between two nodes with control including related control signals, optimized in accordance with some embodiments.

To address this problem, mechanisms/protocols to optimize radio configurations, such as transmit power, MCS (Modulation and Coding Scheme or data rate), channel bandwidth (e.g., number of 802.11-ax sub-channels), etc., are proposed based on the information exchanged among the participating stations so that they can complete data transmission earlier and at substantially the same time, as shown in FIG. 5B. The figure illustrates a scenario where nodes A and/or B adjust their radio configurations and complete data transmission at the same time, as shown in the figure.

The main benefit of the optimization is two-fold:

1. Improved spectrum efficiency: overall transmission time is reduced, e.g., additional spectrum availability from $T_{1'}$ to T2 in FIG. 5B compared to FIG. 5A.

2. Improved radio/platform energy efficiency: allows the wireless devices complete data transmission earlier and enter low-power sleep states.

Note that a two node FD communication scenario was used as an example. An elaboration on the above optimization proposal for both two and three node FD scenarios is discussed below.

Embodiments described herein help ensure an efficient use of wireless spectrum for FD communications by coordinating the spectrum use of multiple radios/devices. A key idea is to dynamically adjust radio configurations via collaboration among devices, such as for transmit power, MCS, channel bandwidth, etc., so that all the participating devices can complete their data transmission earlier and at the same time, improving spectrum efficiency and radio/platform energy efficiency.

To achieve this goal, it is proposed that a new MAC-layer mechanisms/protocols that allow participating nodes to share relevant information to collaboratively optimize their transmission configurations, such as transmit power, MCS, channel bandwidth, etc. The proposed MAC protocol allows the participating nodes to share information such as data size, transmit power, SIC capability, a set of available MCS and adjust radio configurations accordingly, on-the-fly.

As shown in FIG. 5A, the current FD communication system may not achieve its full potential gain (i.e., 2× spectrum efficiency) because the nodes may not be able to complete their transmissions at the same time, resulting in a waste of spectrum resources. This is not unusual in real-world scenarios due to many reasons including different traffic characteristics (e.g., uplink vs. downlink), nodes' heterogeneous interference cancellation capability, etc.

The problem is solved, and the disclosed embodiments improve spectrum efficiency in FD communication scenarios by dynamically adjusting radio configurations (transmit power and MCS) so that their transmissions can be completed approximately at the same time. This proposal can be applied to and become part of the 802.11 WLAN or Bluetooth systems. The potential benefits include (but not limited to) (i) creating new usages, (ii) improving throughput gain from FD communications, and (iii) enabling FD communications for wider range of services, applications (e.g., video conferencing), and topologies (e.g., densely populated Wi-Fi networks).

In some examples, a wireless medium reservation message, such as a Request to Send (RTS) message and a confirmation message of the wireless reservation message, such as a Clear to Send (CTS) message may allow the communicating wireless devices to communication in full duplex communication. The RTS and CTS messages are specified by the 802.11 standards for reserving the wireless medium. The RTS message is sent by a first one of the two communicating wireless devices (sometimes referred to as the "initiating device") and is acknowledged by a CTS message by the second one of the two communicating devices (sometimes referred to as the "responding device"). The RTS frame carries a duration value which covers the CTS response plus the time needed for the subsequent data exchange. The CTS response includes a duration field which may be set to the duration field value seen in the RTS less both the Short Interframe Space (SIFS) period and the duration of the CTS response itself. Other devices in the wireless network which hear one or both of these messages will refrain from transmitting based upon the duration values specified in these messages. Once the data exchange period begins, both the initiating device and the responding device may thus transmit and receive simultaneously. Devices may signal their capabilities to engage in full-duplex transmissions through prior signaling. For example, devices may signal their capabilities in one or more fields in a message preamble such as a HT Capabilities field of a Beacon, Probe Response, or other message.

A detailed protocol design for two node and for three node FD communication scenarios, as shown in FIGS. 4B and 4C, are described below.

Two Node Topology

FIG. 6 illustrates full duplex communication between two nodes with control including related control signals, optimized in accordance with some embodiments. As used herein "data" and "message" may be used interchangeably in some instances, as context indicates. Assume Node A and Node B both have data to send to each other.

Step 1 (Two Node Topology)

Node A wins the channel contention and sends FD-RTS 610 (Full-Duplex Request to Send) to Node B:

FD-RTS indicates Node A's message length ($L_A$), transmit power ($P_{tx,A}$), and SIC capability ($h_{SIC,A}$ where $0<h_{SIC,A}<1$)

Node B measures the received power, $P_{rx,B}$, and calculates the channel gain between Node A and Node B, $H_{A \to B}$, i.e., $$h_{A \to B} = \frac{P_{rx,B}}{P_{tx,A}} \quad (1)$$

Node B compares the message lengths $L_A$ and $L_B$

If $L_B<L_A$, then case B; otherwise case A

Step 2 (Two Node Topology)

Node A or Node B adjusts its transmit power as follows:

For case B (i.e., $L_B<L_A$)

Node B calculates the transmit power, $P^*_{tx,B}$, that minimizes the difference between Node A and Node B's expected transmission time as follows:

$$\text{Find } P^*_{tx,B} \text{ s.t. } \min \left| \frac{L_A}{MCS_A(P_{tx,B})} - \frac{L_B}{MCS_B(P_{tx,A})} \right| \quad (2)$$

where $P_{tx,B}$ is the transmit power of Node B,
$L_A$ is the transmitted message length of Node A,
$L_B$ is the transmitted message length of Node B,
$MCS_A$ is the data rate of an MCS used by Node A, and
$MCS_B$ is the data rate of an MCS used by Node B In Equation (2), $MCS_A$ and $MCS_B$ are a function of $P_{tx,B}$ and can be calculated as follows:

$$MCS_A = f\left(\frac{P_{rx,B}}{N_0 + P_{tx,B} \times h_{SIC,B}}\right) \text{ and } MCS_B = f\left(\frac{P_{tx,B} \times h_{B \to A}}{N_0 + P_{tx,A} \times h_{SIC,A}}\right) \quad (3)$$

where $N_O$ is the noise power,
$h_{A \to B}$ is the channel gain indicated in FD-RTS in Step 1, and
$h_{SIC,A}$ is the SIC capability indicated in FD-RTS in step 1.

Here we assume channel reciprocity, i.e., $h_{A \to B} \approx h_{B \to A}$

Node B replies to Node A with FD-CTS 620, with a field that indicates the calculated data rate $MCS_A$ (or the MCS index of $MCS_A$) and a field indicating that Node B has data for Node A.

Node A transmits a data frame at the data rate $MCS_A$ with the transmit power $P_{tx,A}$ and Node B transmits a data frame at the data rate $MCS_B$—with the transmit power $P^*_{tx,B}$. Nodes A and B may transmit multiple or aggregated frames (e.g., Aggregated MAC Protocol Data Units (A-MPDUs)) when needed. In this case, the above calculations for optimal transmission parameters are based on the entire A-MPDU transmission, so that A-MPDU transmission can be completed at substantially the same time.

For case A (i.e., $L_A<L_B$)

Node B calculates the transmit power, $P^*_{tx,A}$, that minimizes the difference between Node A and Node B's expected transmission time as follows:

$$\text{Find } P^*_{tx,A} \text{ s.t. } \min \left| \frac{L_A}{MCS_A(P_{tx,A})} - \frac{L_B}{MCS_B(P_{tx,A})} \right| \quad (4)$$

where $$MCS_A = f\left(\frac{P_{tx,A} \times h_{A \to B}}{N_o + P_{tx,B} \times h_{SIC,B}}\right) \text{ and } MCS_B = f\left(\frac{P_{tx,B} \times h_{B \to A}}{N_o + P_{tx,A} \times h_{SIC,A}}\right) \quad (5)$$

Node B replies to Node A with FD-CTS 620 with a field that indicates the calculated transmit power $P^*_{tx,A}$ and the calculated $MCS_A$, and a field indicating that Node B has data for Node A.

Node A transmits a data frame at the data rate $MCS_A$ with the transmit power $P^*_{tx,A}$ and Node B transmits a data frame at the data rate $MCS_B$ with the maximum transmit power $P_{tx,B}$.

Step 3 (Two Node Topology)

Upon the completion of data transmission, Node A and Node B send an acknowledgement (ACK) packet to each other as seen in FIG. 6. For example, in case B, if Node B reduces its transmit power $P_{tx,B}$, then $MCS_B$ will decrease, hence the expected transmission time of B will be increased, as shown in FIG. 5B compared to FIG. 5A. On the other hand, $MCS_A$ will increase due to the reduced $P_{tx,B}$ (hence decreased self-interference in Node B), and the expected transmission time of A will be decreased, as shown in FIG. 5B compared to FIG. 5A. In Case A, if Node A reduces its transmit power Ptx,A, then MCSA will decrease, hence the expected transmission time of A will be increased. On the other hand, MCSB will increase due to the reduced Ptx,A (hence decreased self-interference in Node A), and the expected transmission time of B will be decreased.

Three Node Topology

Figure 7:
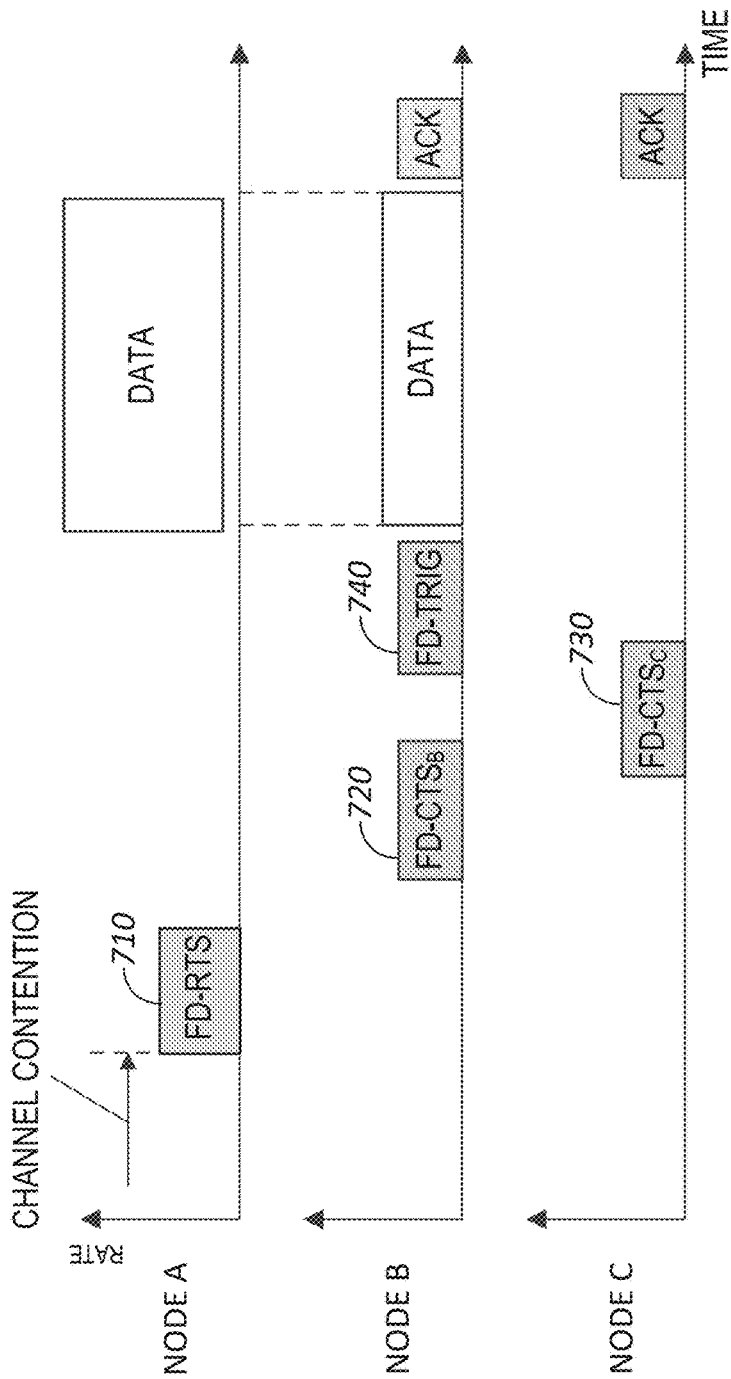
FIG. 7 illustrates full duplex communication with three nodes with control signals, optimized in accordance with some embodiments.

Below we describe the proposed mechanism for three node FD scenario, as shown in FIG. 7. FIG. 7 illustrates full duplex communication with three nodes with control signals, optimized in accordance with some embodiments. Here we assume that Node B (e.g., AP of FIG. 4C) does not have data to send Node A, but has data to send to Node C. Here we consider a scenario where Node B (AP) adjusts its radio configuration.

Step 1 (Three Node Topology)
Node A wins the channel contention and sends FD-RTS$_A$ 710 to Node B:
 FD-RTS$_A$ 710 indicates Node A's message length (L$_A$), transmit power (P$_{tx,A}$), and SIC capability (h$_{SIC,A}$)
Node B measures the received power from Node A, P$_{rx,A \to B}$, and calculates the channel gain, h$_{A \to B}$, i.e.:

$$h_{A \to B} = \frac{P_{rx,A \to B}}{P_{tx,A}} \quad (6)$$

Node C measures the received power from Node A, P$_{rx,A \to C}$.
Step 2 (Three Node Topology)
Node B sends FD-CTS$_B$ 720 to Node A and Node C.
FD-CTS$_B$ 720 indicates
 A field indicating that Node B does not have data for Node A
 Upon the reception of FD-CTS$_B$, 720, Node A waits for the FD-TRIG frame, 740, for data transmission, as shown in FIG. 7.
 A field indicating that Node B has data for Node C
 Node B's message length (L$_B$), transmit powers (P$_{tx,A}$ and P$_{tx,B}$), SIC capability (h$_{SIC,B}$), and channel gain h$_{A \to B}$ calculated in Step 1 Note that Node A's and Node B's transmit powers information will be used by Node C to calculate channel gains, in Equations. (7) and (8). Other information are optional to share with Nodes A and C.
Upon reception of FD-CTS$_B$ 720
 Node C measures the received power, P$_{rx,B \to C}$, and calculates the channel gain, h$_{B \to C}$, i.e., $$h_{B \to C} = \frac{P_{rx,B \to C}}{P_{tx,B}} \quad (7)$$

Node C calculates the channel gain, h$_{A \to C}$, i.e., $$h_{A \to C} = \frac{P_{rx,A \to C}}{P_{tx,A}} \quad (8)$$

where
P$_{rx,A \to C}$ is measured in Step 1, and
P$_{tx,A}$ is found from FD-RTS$_B$ 720.
Step 3 (Three Node Topology)
Node C sends FD-CTS$_C$ 730 to Node B
FD-CTS$_C$ 730 indicates channel gains h$_{A \to C}$ and h$_{B \to C}$ calculated in Step 2
Step 4 (Three Node Topology)
Node B finds the optimal transmit power, P*$_{tx,A}$, that minimizes the difference between Node A and Node B's expected transmission time as follows:

$$\text{Find } P^*_{tx,A} \text{ s.t. } \min \left| \frac{L_A}{MCS_A(P_{tx,A})} - \frac{L_B}{MCS_B(P_{tx,A})} \right| \quad (9)$$

where $$MCS_A = f\left(\frac{P_{tx,A} \times h_{A \to B}}{N_o + P_{tx,B} \times h_{SIC,B}}\right) \text{ and } MCS_B = f\left(\frac{P_{tx,B} \times h_{B \to A}}{N_o + P_{tx,A} \times h_{A \to C}}\right) \quad (10)$$

where
h$_{A \to C}$ is the channel gain information from FD-CTS$_C$ 730 in Step 3, and
P$_{tx,B}$ is Node B's transmit power.

Node B transmits a control frame (e.g., FD-TRIG 740) to Node A with the calculated P*$_{tx,A}$ and MCS$_A$ from Equations (9) and (10).
Node A then starts data transmission at the data rate MCS$_A$ with transmit power P*$_{tx,A}$ and Node B starts data transmission at the data rate MCS$_B$ with Node B's transmit power P$_{tx,B}$.
Step 5 (Three Node Topology)
Upon the completion of data transmission, Node B and Node C send ACK packets to Node A and Node B, respectively.

Figure 8:
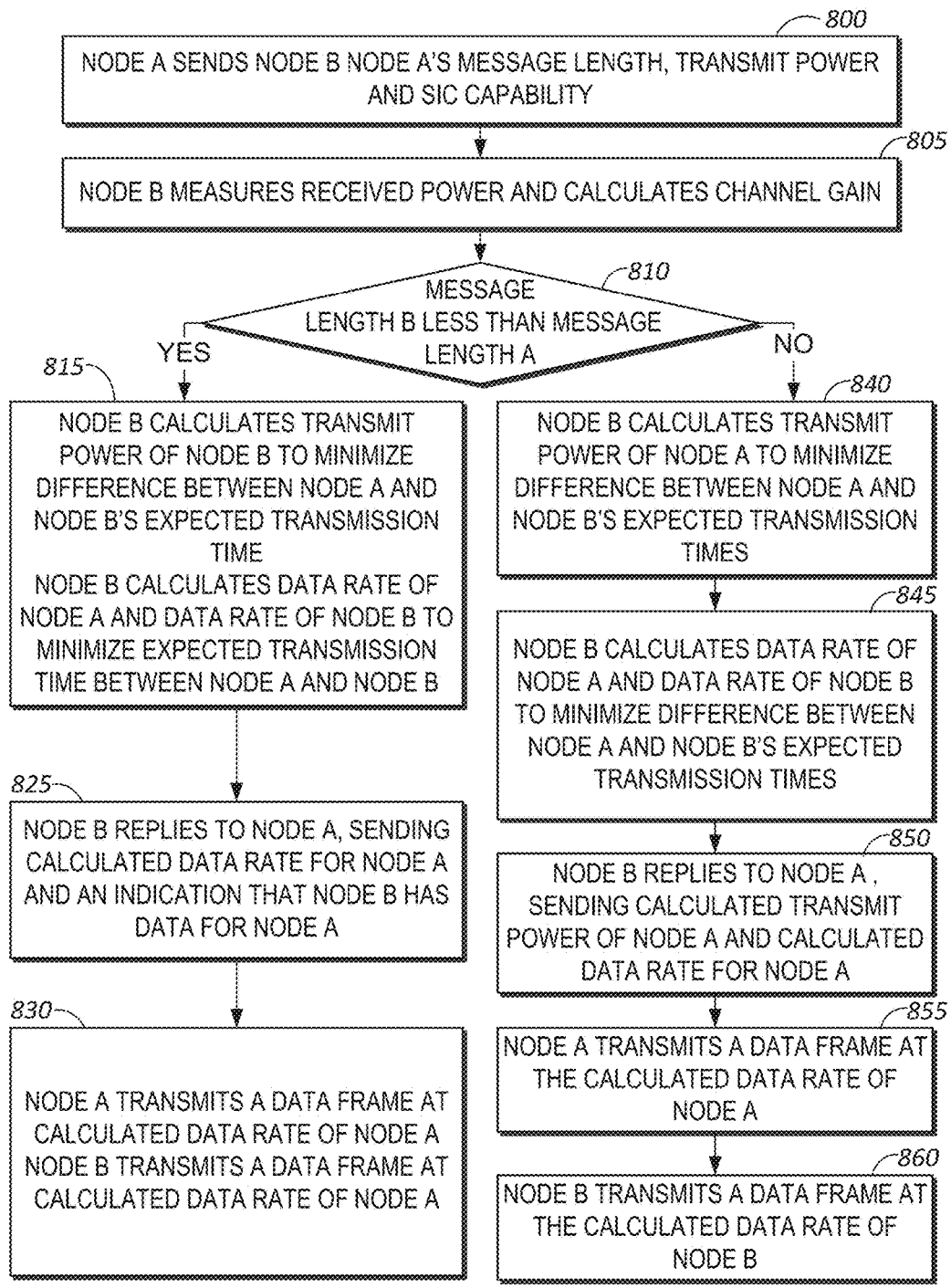
FIG. 8 is a flowchart showing full duplex operation for the two-node scenario, optimized in accordance with some embodiments.

FIG. 8 is a flowchart showing full duplex operation for the two-node scenario, optimized in accordance with some embodiments, and describes in flowchart format the operation of the two node topology discussed above. FIG. 8 describes full duplex communication outlined in the drawing of FIG. 4B where Node A is the client and Node B is the access point. The initial assumption is that Node A wins the channel contention and at 800 sends Node B the message length, transmit power and SIC capability of Node A. At 805 Node B measures the received power at Node B and calculates the channel gain as in Equation (1), above. At 810 Node B compares the message lengths of Node A and Node B. The comparison will ultimately determine adjustments of radio configurations to equalize transmission time of Node A and Node B. If the message length of Node B is less than the message length of Node A as at YES at 810 (which is illustrated at FIG. 5A), the transmit power of Node B will be adjusted. Beginning at 815, Node B calculates the transmit power of Node B to minimize the difference between Node A and Node B's expected transmission time for the message as in Equation (2). At 820 Node B calculates the data rate of Node A and the data rate of Node B to minimize the expected transmission between Node A and Node B as in Equation (3). Note that, in Equation (2), data rates of Node A and Node B are a function of transmit power of Node A, and can be calculated as shown in Equation (3). Note also that Node B is calculating Node A's optimal transmit power which will also determine Node A and B's data rates because the data rates are determined by the transmit power (and other known parameters, such as SIC capability). At 825 Node B replies to Node A's message (at 800) by sending the above calculated transmit power and data rate for Node A and also indicates that Node B has data for Node A. At 830 Node A transmits a data frame at calculated data rate of Node A and at 835 Node B transmits a data frame at the calculated data rate of Node B and with the maximum transmit power of Node B. For clarification, Nodes A and B transmit their data at the same time, not sequentially. Transmission between Node A and Node B continues, with the message transmission of each of Node A and Node B completing at substantially the same time, as shown in FIG. 5B.

If the decision at 810 is NO, which indicates that message length A is less than message length B, then at 840 Node B calculates the transmit power of Node A to minimize the difference between Node A and Node B's expected transmission times as at Equation (4). At 845 Node B calculates the data rate of Node A and the data rate of Node B to minimize the difference between Node A and Node B's expected transmission times, as at Equation (5). At 850 Node B replies to Node A's transmission originally described at 800 and sends the calculated transmit power of Node A and the calculated data rate for Node A and also indicates that Node B has data for Node A. At 855 Node A transmits a data frame at the calculated data rate and the transmit power from step 850. At 860. Node B transmits a data frame at the calculated data rate of Node B from step 845. Transmission between Node A and Node B continues, with the message transmission of each of Node A and Node B completing at substantially the same time, ad show in FIG. 5B.

Figure 9A:
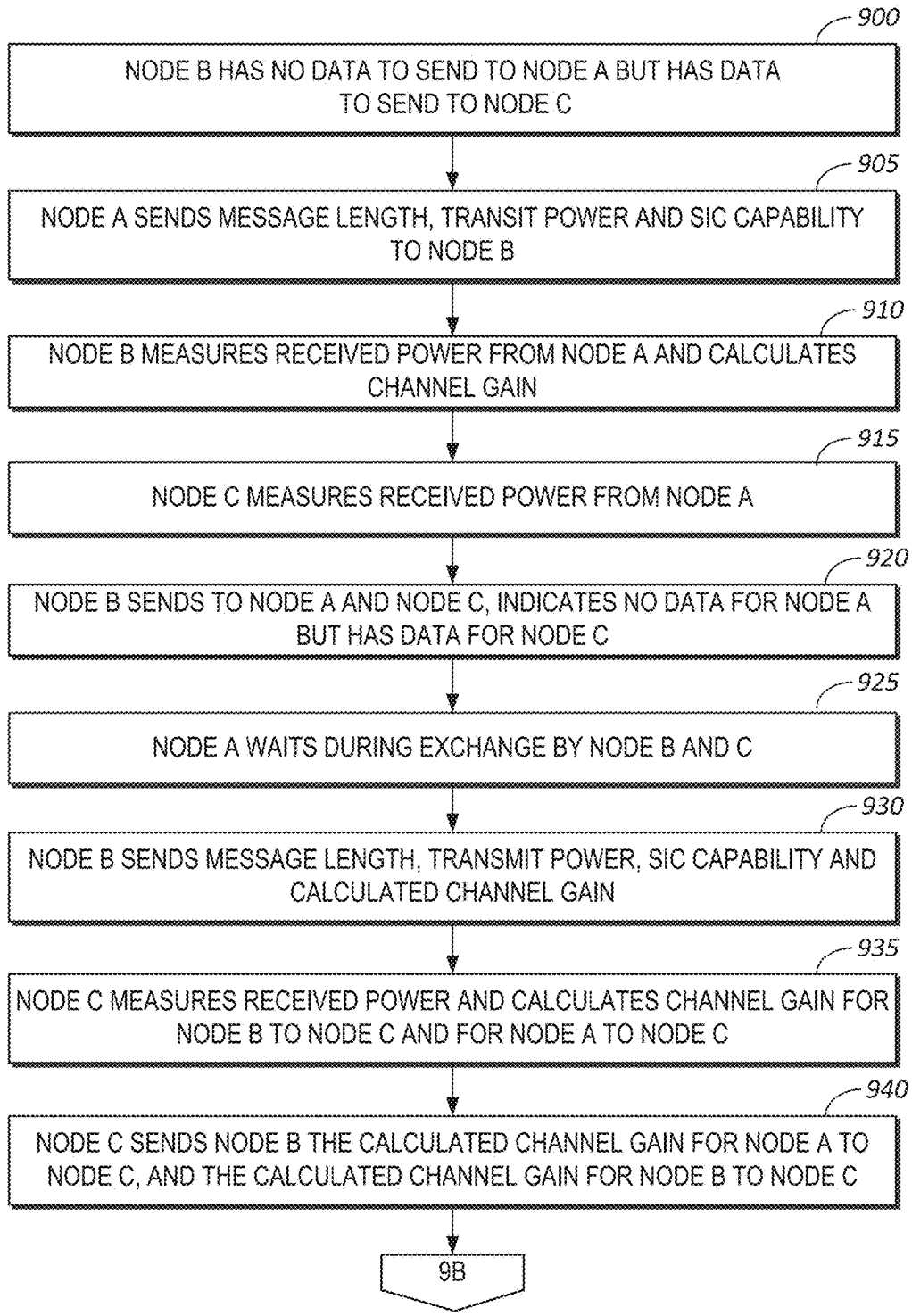
FIGS. 9A-9B comprise a flowchart showing full duplex operation for the three-node scenario, optimized in accordance with some embodiments.
Figure 9B:
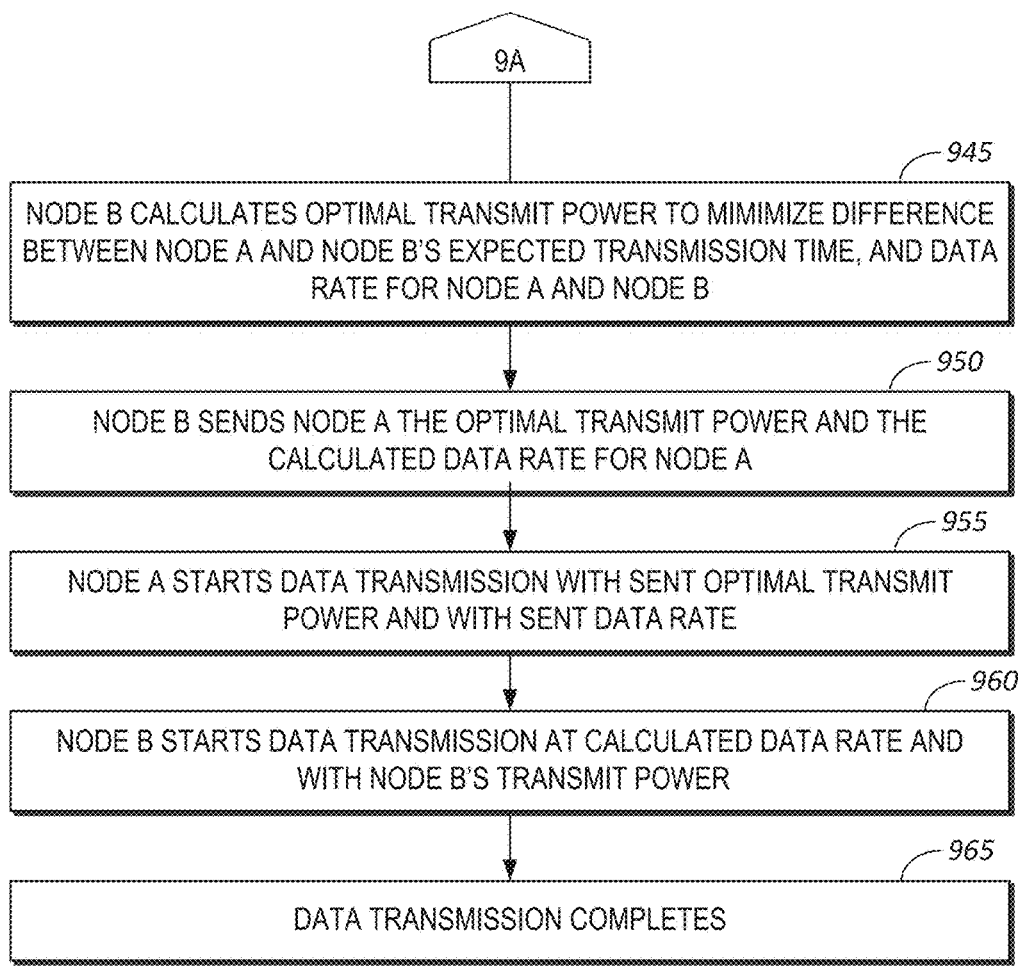

FIGS. 9A-9B comprise a flowchart showing full duplex operation for the three-node scenario, optimized in accordance with some embodiments. FIGS. 9A and 9B describe full duplex communication outlined in the drawing of FIG. 4C where Node A is the first client, Node B is the access point, and Node C is the second client. The assumptions for FIG. 9A, at 900, are that Node B has no data to send to Node A, but that Node B does have data to send to Node C. In this scenario Node B, which is an access point in the example of FIG. 4C, calculates the optimal radio configurations for node A.

At 905 Node A sends Node B message length for the message it has to send to Node B, and its transmit power and SIC capability. At 910 Node B measures received power from Node A and calculates channel gain as at Equation (6). At 915 Node C measure received Power from Node A. At 920 Node B transmits to Node A and to Node C, the transmission to Node A indicates that Node B has no data to transmit to Node A, and the transmission to Node C indicates that Node has data to transmit to Node C Node B at 930 then sends Node A the message length for the message it has for Node C, Node A's transmit power, Node B's transmit power, SIC capability, and the calculated channel gain from 910. Just for clarification, 920 and 930 are the same transmission, i.e., FD-CTS$_B$ 720 in FIG. 7. At 935 Node C measures the received power from Node B and calculates the channel gain for Node B to Node C as at Equation (7) and the channel gain or Node A to Node C as at Equation (8). At 940 Node C sends to Node B the calculated channel gain from Node A to Node C and the calculated channel gain for Node B to Node C.

At FIG. 9B, Node B then calculates the optimal transmit power of Node A to minimize the difference between Node A and Node B's expected transmission time, and the data rate for Node A and Node B, also to minimize the difference between Node A and Node B's expected transmission time, as at Equation (9) and Equation (10), respectively. Again, the two data rates will be determined by Node A's transmit power. At 950 Node B then sends to Node A the calculated optimal transmit power and the calculated data rate, for Node A. At 955 Node A begins data transmission to Node B with the sent, calculated optimal transmit power and the calculated data rate that was sent for Node A by Node B. Node B begins data transmission at the calculate data rate for Node B and at Node B's transmit power. The data transmission continues to completion, at substantially the same time. Node B and Node C then send the usual acknowledgement packets to Node A and Node B, respectively.

Performance Benefit Analysis for Two-Node Topology

Here we demonstrate the efficacy of the proposed mechanism in terms of throughput, transmission time, and MCS adaption. We compare the behavior of the proposed mechanism (denoted as "Opt") with the conventional mechanism (denoted as "Non-opt") in the drawings.

For "Opt", the full-duplex Node A and Node B (or STA and AP), as seen in FIG. 4B) calculates the optimal MCSes that minimizes the total transmission time (or match the uplink and downlink transmission times, as shown in FIG. 6). The transmission from Node A (or STA) to B (or AP) is referred to as "uplink" transmission and transmission from Node B to A is referred to as "downlink" transmission. Also assume Node B has a better SIC capability—Node B (or AP) has perfect SIC capability (i.e., it can completely cancel its own transmission) whereas Node A (or STA) has imperfect SIC and its received signal power degrades by 6 dB due to its own transmission. Received power (before SNR drop due to SIC) is −65 dBm (which allows use of 64QAM3/4). In the simulation, we assume an asymmetric link, in which downlink frame size is fixed at 1500 byte (i.e., MTU size), whereas uplink frame size varies from 40 byte to 1500 byte.

Throughput Performance

Figure 10:
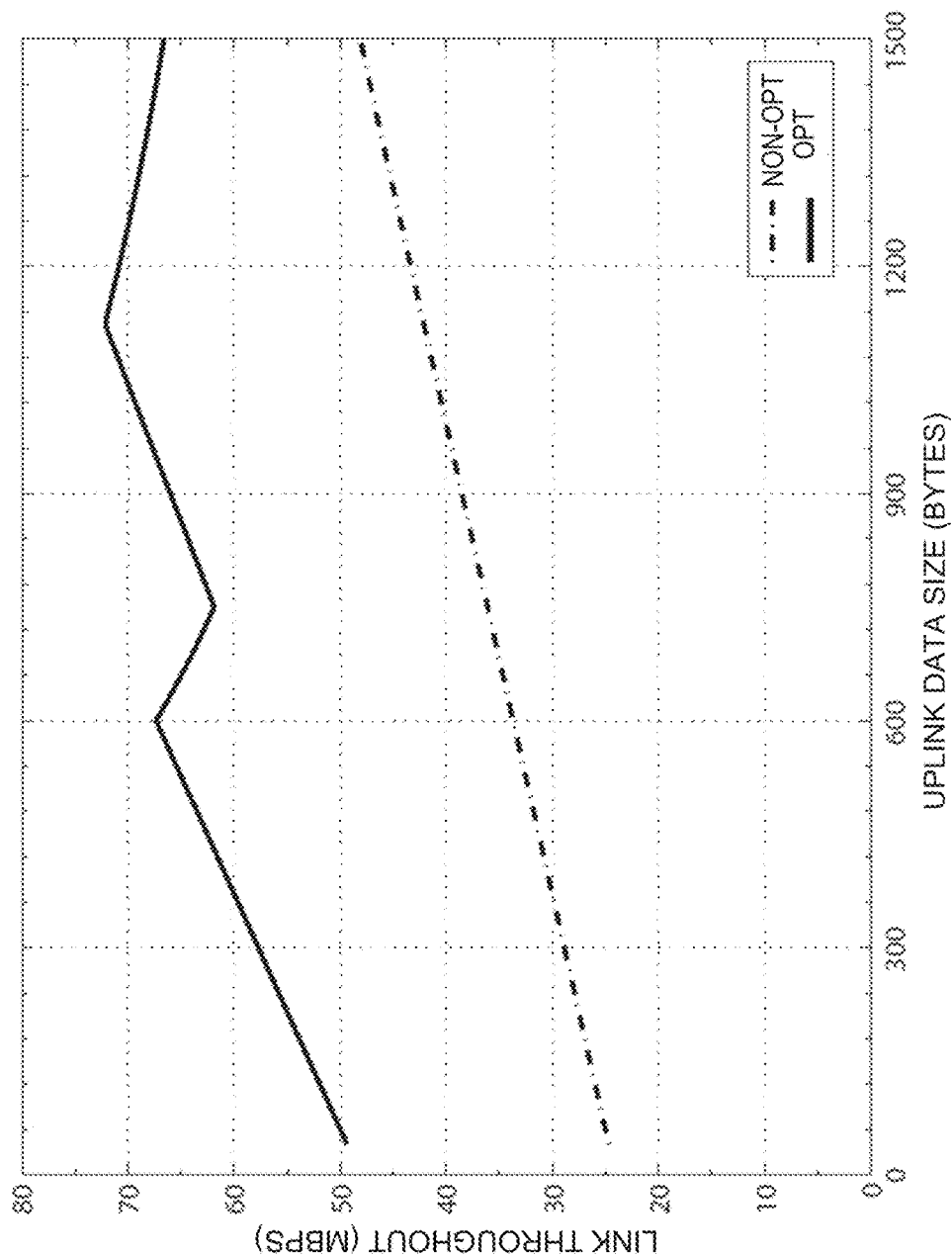
FIG. 10 illustrates the comparison of link throughput for optimized and non-optimized full duplex operation in accordance with some embodiments.

FIG. 10 illustrates the comparison of link throughput for optimized and non-optimized full duplex operation in accordance with some embodiments. FIG. 10 compares achieved full-duplex link throughput with and without optimization. The figure shows that the proposed optimization mechanism can significantly improve the link throughput by dynamically adjusting its MCSes to match the downlink and uplink transmission time so as to minimize the waste of spectrum resources shown in FIG. 6. FIG. 10 shows the sum of uplink and downlink throughput (or full-duplex link throughput). X-axis shows the uplink data size and downlink data size is fixed at 1500 byte for all different uplink data size, as stated in above.

Transmission Time

Figure 11B:
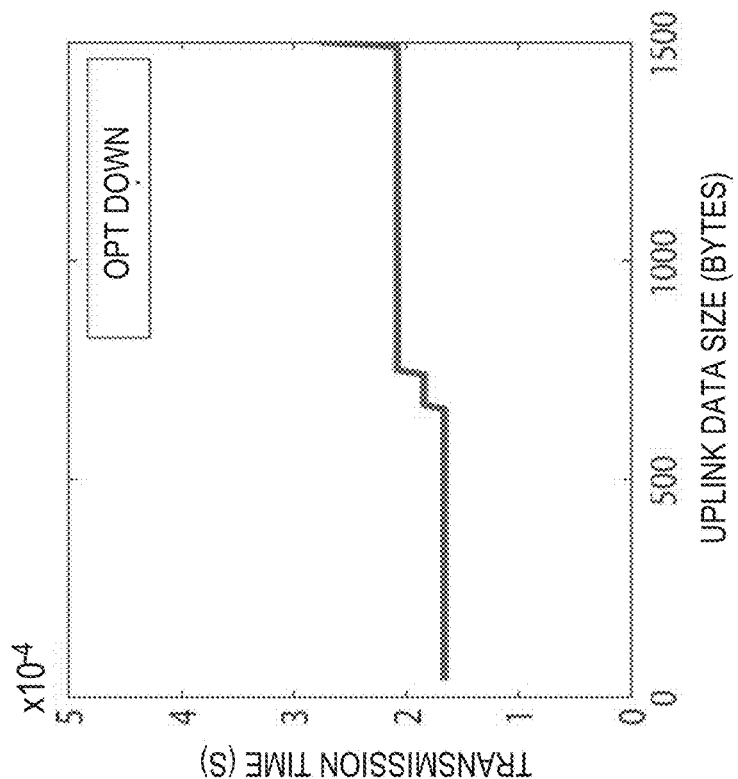
FIGS. 11A-11B illustrate comparison of downlink transmission time for optimized and non-optimized full duplex operation in accordance with some embodiments.
Figure 11A:
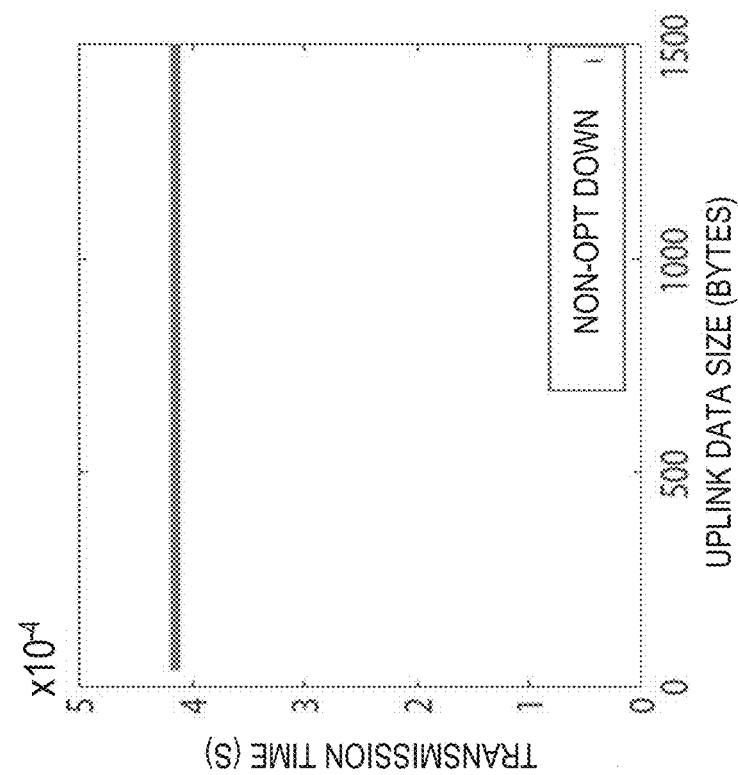
Figure 11D:
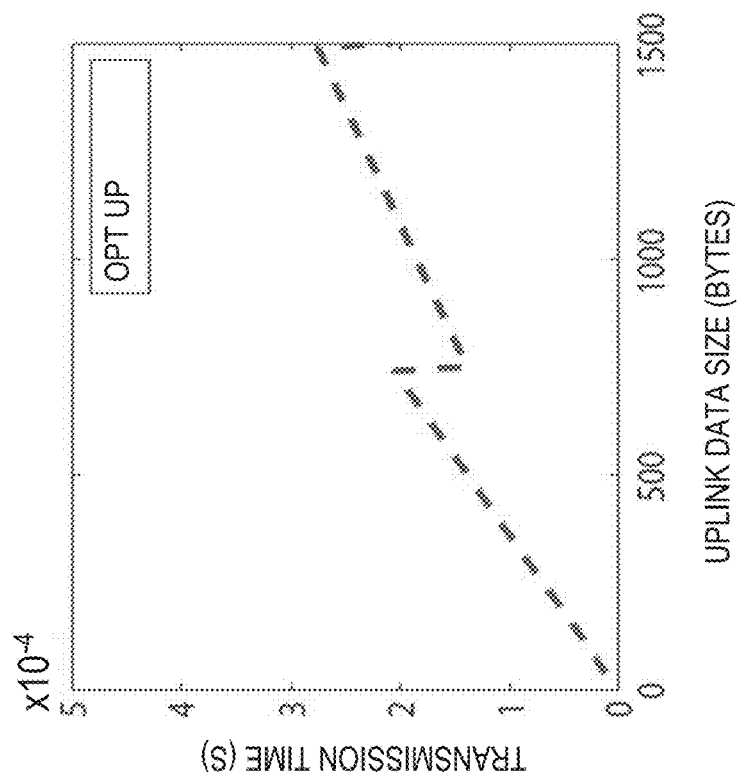
FIGS. 11C-11D illustrate comparison of uplink transmission time for optimized and non-optimized full duplex operation in accordance with some embodiments.
Figure 11C:
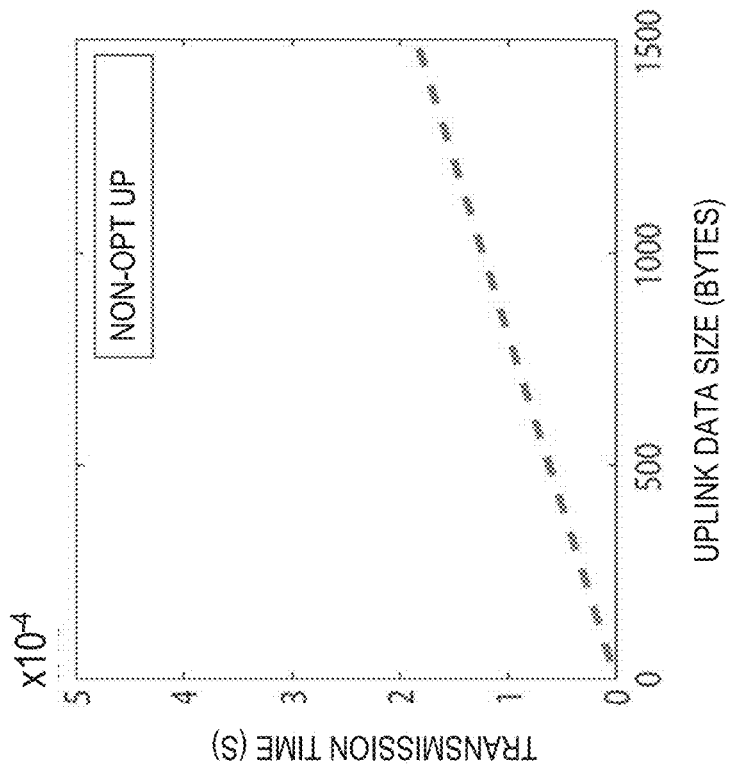

FIGS. 11A-11D show the downlink and uplink transmission time with and without optimization. FIGS. 11A-11B illustrate comparison of downlink transmission time for optimized and non-optimized full duplex operation in accordance with some embodiments. FIGS. 11C-11D illustrate comparison of uplink transmission time for optimized and non-optimized full duplex operation in accordance with some embodiments. The x-axes in the figures are uplink data size. Downlink data size is fixed and the figures show downlink transmission time while varying uplink data size. The figures show that for "Opt", when uplink data size is small, it reduces downlink transmission time and increases uplink transmission time to match the downlink/uplink transmission time. Therefore, for "Opt", even for a fixed downlink data size, downlink transmission time varies depending on uplink data size. The figures show that for "Non-opt" case, downlink transmission takes a fixed amount of time regardless of the uplink frame size, and in general downlink transmission takes much longer time than the uplink transmission, resulting in a waste of spectrum opportunities, as shown in FIG. 5A. On the other hand, the proposed scheme ("Opt") significantly reduces the downlink transmission time and the difference between downlink and uplink transmission time is much smaller than the "Non-opt" case, resulting in a more efficient use of the spectrum, as shown in FIG. 5B and FIG. 12.

Figure 12:
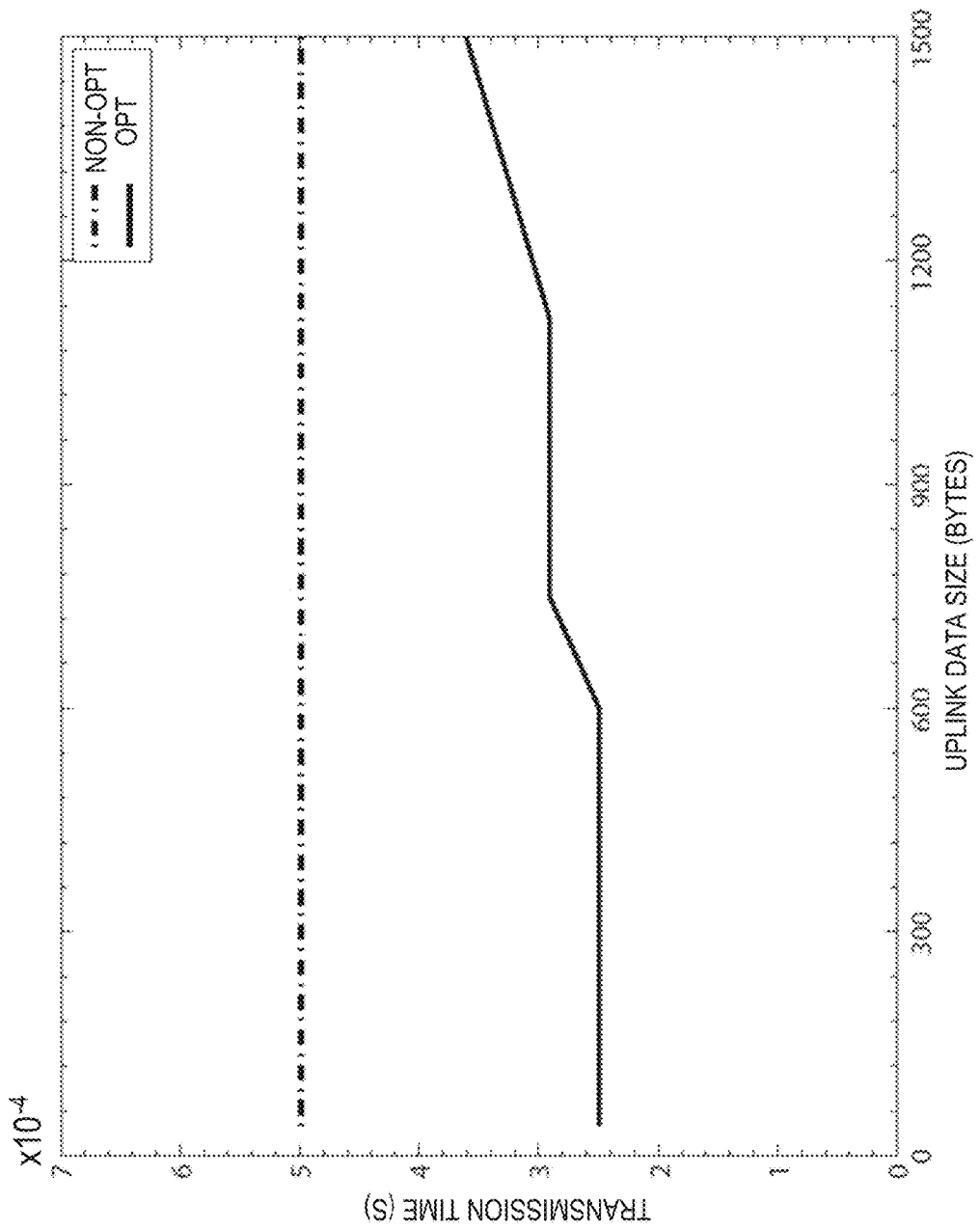
FIG. 12 illustrates total transmission time for optimized and non-optimized full duplex operation in accordance with some embodiments.

FIG. 12 illustrates total transmission time for optimized and non-optimized full duplex operation in accordance with some embodiments. In other words comparison is made for the total uplink transmission time of the conventional (i.e., "Non-opt") and the proposed (i.e., "Opt") schemes, including transmission time for control frames, such as FD-RTS, FD-CTS, and ACK. The figure shows that the proposed scheme significantly reduces the overall transmission time, resulting in better spectrum efficiency and reduced radio/platform energy consumption.

MCS Adaptation

Figure 13B:
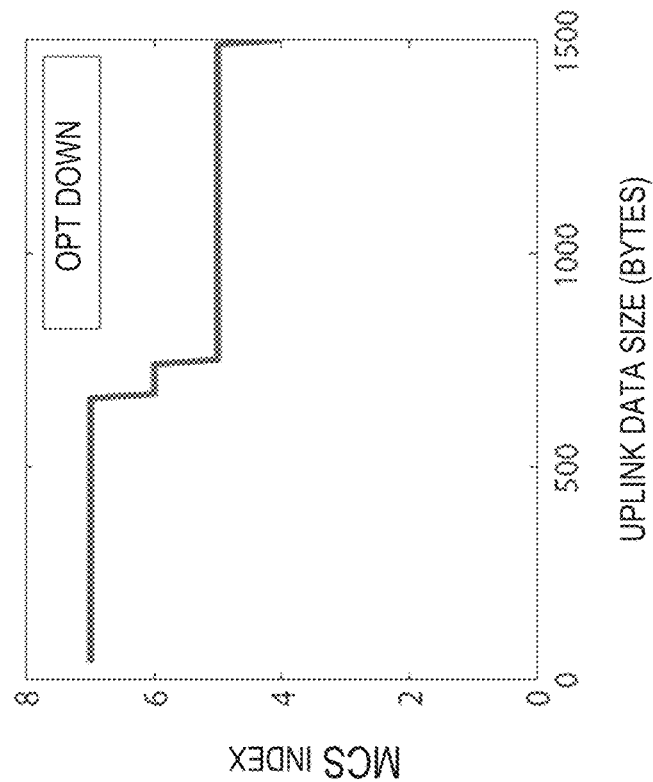
FIGS. 13A-13B illustrate comparison of MCS (Modulation and Coding Scheme) index used for downlink transmission for optimized and non-optimized full duplex operation in accordance with some embodiments.
Figure 13A:
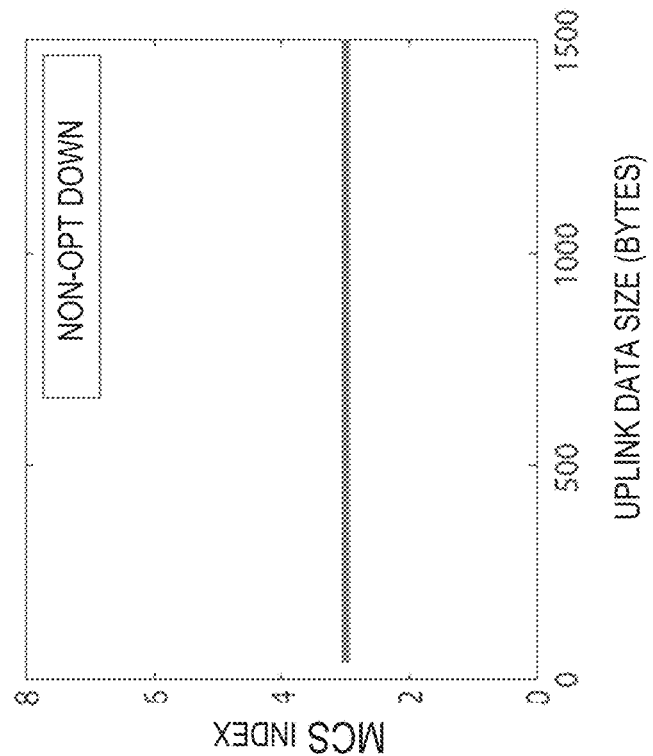
Figure 13D:
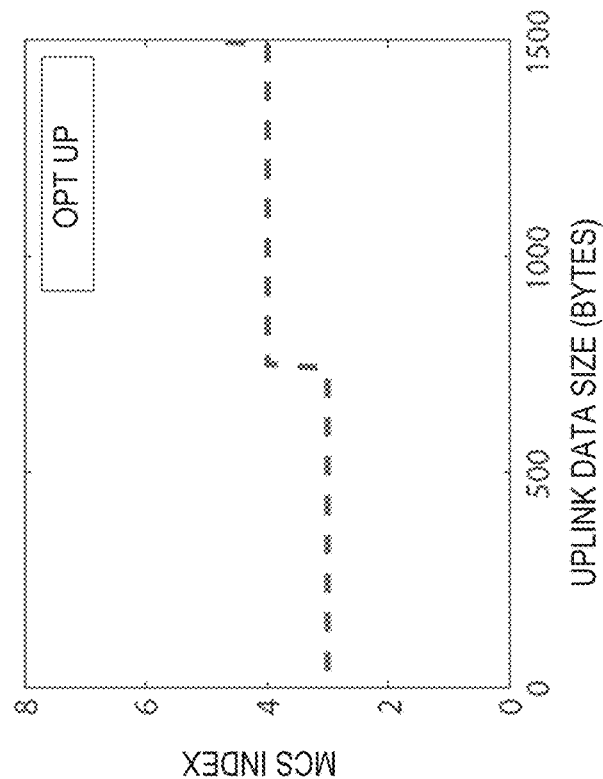
FIGS. 13C-13D illustrate comparison of MCS (Modulation and Coding Scheme) index used for uplink transmission for optimized and non-optimized full duplex operation in accordance with some embodiments.
Figure 13C:
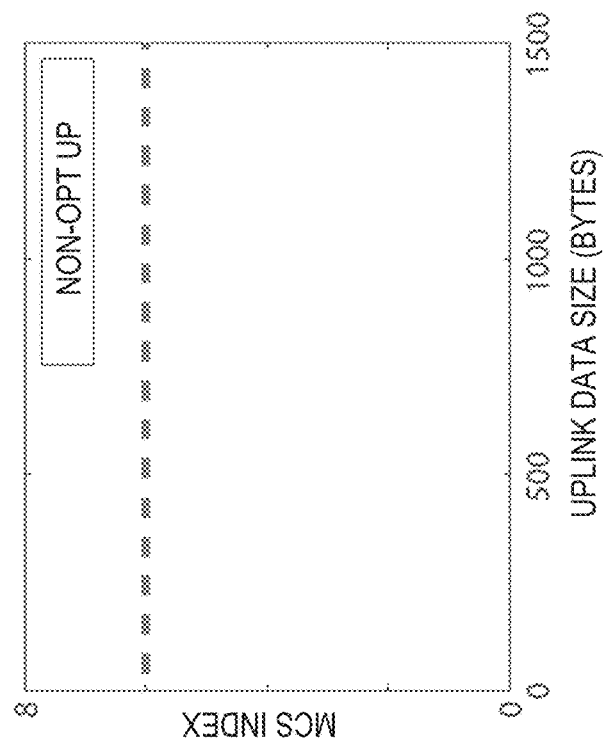

FIGS. 13A-13B illustrate comparison of Modulation and Coding Scheme (MCS) index used for downlink transmission for optimized and non-optimized full duplex operation in accordance with some embodiments. FIGS. 13C-13D illustrate comparison of Modulation and Coding Scheme (MCS) index used for uplink transmission for optimized and non-optimized full duplex operation in accordance with some embodiments. The x-axes are uplink data size. For the "Non-opt" case, both the downlink and uplink transmission use the same MCS regardless of the uplink frame size, resulting in a large difference in downlink and uplink transmission time, as shown in FIGS. 11A-11D. On the other hand, for the "Opt" case, the nodes adjust their MCSes depending on various factors, including SIC capabilities, downlink and uplink frame size, etc., so as to minimize the overall transmission time (or minimize the maximum of downlink and uplink transmission time).

Figure 14A:
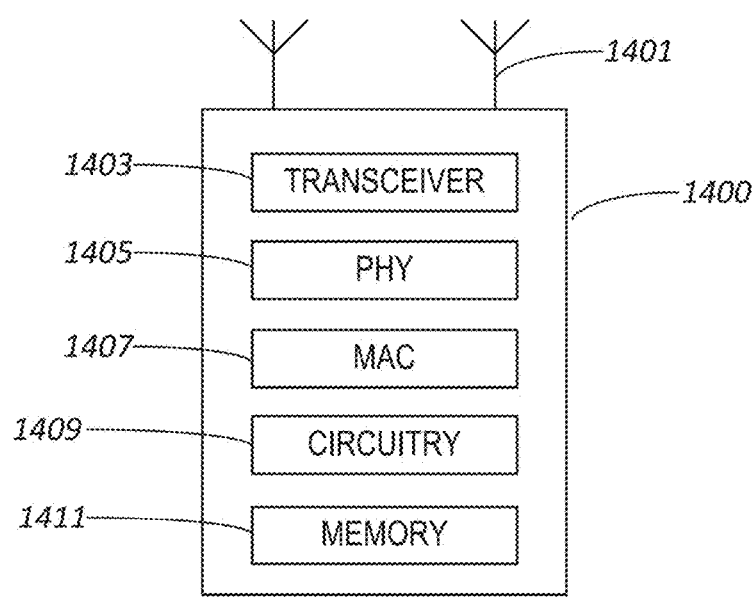
FIG. 14A illustrates a HEW device in accordance with some embodiments.

FIG. 14A illustrates a HEW device 1400 in accordance with some embodiments. HEW device 1400 may be an HEW compliant device that may be arranged to communicate with one or more other HEW devices, such as HEW STAs 104 (FIG. 1) or master station 102 (FIG. 1) as well as communicate with legacy devices 106 (FIG. 1). HEW STAs 104 and legacy devices 106 may also be referred to as HEW devices and legacy STAs, respectively. HEW device 1400 may be suitable for operating as master station 102 (FIG. 1) or a HEW STA 104 (FIG. 1). In accordance with embodiments, HEW device 1400 may include, among other things, a transmit/receive element 1401 (for example an antenna), a transceiver 1403, physical (PHY) circuitry 1405, and media access control (MAC) circuitry 1407. PHY circuitry 1405 and MAC circuitry 1407 may be HEW compliant layers and may also be compliant with one or more legacy IEEE 802.13 standards. MAC circuitry 1407 may be arranged to configure packets such as a physical layer convergence procedure (PLCP) protocol data unit (PPDUs) and arranged to transmit and receive PPDUs, among other things. HEW device 1400 may also include circuitry 1409 and circuitry 1409 configured to perform the various operations described herein. The circuitry 1409 may be coupled to the transceiver 1403, which may be coupled to the transmit/receive element 1401. While FIG. 14A depicts the circuitry 1409 and the transceiver 1403 as separate components, the circuitry 1409 and the transceiver 1403 may be integrated together in an electronic package or chip.

In some embodiments, the MAC circuitry 1407 may be arranged to contend for a wireless medium during a contention period to receive control of the medium for the HEW control period and configure an HEW PPDU. In some embodiments, the MAC circuitry 1407 may be arranged to contend for the wireless medium based on channel contention settings, a transmitting power level, and a CCA level.

The PHY circuitry 1405 may be arranged to transmit the HEW PPDU. The PHY circuitry 1405 may include circuitry for modulation/demodulation, upconversion/downconversion, filtering, amplification, etc. In some embodiments, the circuitry 1409 may include one or more processors. The circuitry 1409 may be configured to perform functions based on instructions being stored in a RAM or ROM, or based on special purpose circuitry. The circuitry 1409 may include processing circuitry and/or transceiver circuitry in accordance with some embodiments. The circuitry 1409 may include a processor such as a general purpose processor or special purpose processor. The circuitry 1409 may implement one or more functions associated with transmit/receive elements 1401, the transceiver 1403, the PHY circuitry 1405, the MAC circuitry 1407, and/or the memory 1411.

In some embodiments, the circuitry 1409 may be configured to perform one or more of the functions and/or methods described herein and/or in conjunction with FIGS. 1-8.

In some embodiments, the transmit/receive elements 801 may be two or more antennas that may be coupled to the PHY circuitry 804 and arranged for sending and receiving signals including transmission of the HEW packets. The transceiver 802 may transmit and receive data such as HEW PPDU and packets that include an indication that the HEW device 800 should adapt the channel contention settings according to settings included in the packet. The memory 810 may store information for configuring the other circuitry to perform operations for configuring and transmitting HEW packets and performing the various operations to perform one or more of the functions and/or methods described herein and/or in conjunction with FIGS. 1-14A.

In some embodiments, the HEW device 1400 may be configured to communicate using OFDM communication signals over a multicarrier communication channel. In some embodiments, HEW device 1400 may be configured to communicate in accordance with one or more specific communication standards, such as the Institute of Electrical and Electronics Engineers (IEEE) standards including IEEE 802.11-2012, 802.11n-2009, 802.11ac-2013, 802.11ax, DensiFi, standards and/or proposed specifications for WLANs, or other standards as described in conjunction with FIG. 1, although the scope of the invention is not limited in this respect as they may also be suitable to transmit and/or receive communications in accordance with other techniques and standards. In some embodiments, the HEW device 1400 may use 4× symbol duration of 802.11n or 802.11ac.

In some embodiments, an HEW device 1400 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as 802.11 or 802.16, or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

The transmit/receive element 1401 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the HEW device 1400 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. Those instructions may then be read and executed by one or more processors to cause the device 1400 to perform the methods and/or operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

Figure 14B:
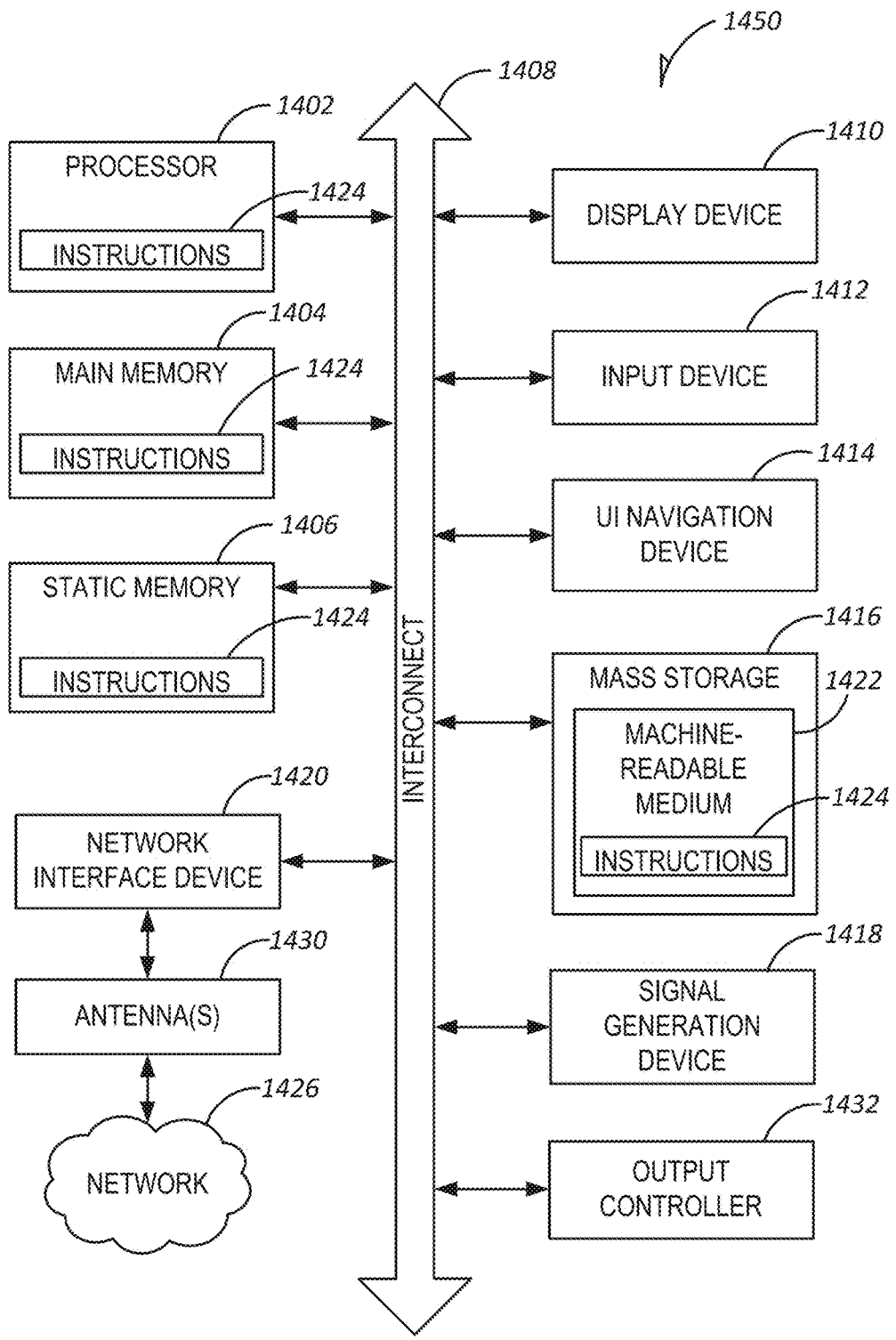
FIG. 14B illustrates a block diagram of an example machine in accordance with some embodiments.

FIG. 14B illustrates a block diagram of an example machine 1450 upon which any one or more of the techniques (e.g., methodologies) discussed herein may perform. In alternative embodiments, the machine 1450 may operate as a standalone device or may be connected (e.g., networked) to other machines. In a networked deployment, the machine 1450 may operate in the capacity of a server machine, a client machine, or both in server-client network environments. In an example, the machine 1450 may act as a peer machine in peer-to-peer (P2P) (or other distributed) network environment. The machine 1450 may be a <UE/eNodeB/AP/STA/ETC>, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) may include a hardware processor 1402 (e.g., a central processing unit (CPU), a graphics processing unit (GPU), a hardware processor core, or any combination thereof), a main memory 1404 and a static memory 1406, some or all of which may communicate with each other via an interlink (e.g., bus) 1408. The machine 1450 may further include a display unit 1410, an alphanumeric input device 1412 (e.g., a keyboard), and a user interface (UI) navigation device 1414 (e.g., a mouse). In an example, the display unit 1410, input device 1412 and UI navigation device 1414 may be a touch screen display. The machine 1450 may additionally include a storage device (e.g., drive unit) 1416, a signal generation device 1418 (e.g., a speaker), a network interface device 1420, and one or more sensors, such as a global positioning system (GPS) sensor, compass, accelerometer, or other sensor. The machine 1450 may include an output controller 1428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1416 may include a machine readable medium 1422 on which is stored one or more sets of data structures or instructions 1424 (e.g., software) embodying or utilized by any one or more of the techniques or functions described herein. The instructions 1424 may also reside, completely or at least partially, within the main memory 1404, within static memory 1406, or within the hardware processor 1402 during execution thereof by the machine. In an example, one or any combination of the hardware processor 1402, the main memory 1404, the static memory 1406, or the storage device 1416 may constitute machine readable media.

While the machine readable medium 1422 is illustrated as a single medium, the term "machine readable medium" may include a single medium or multiple media (e.g., a centralized or distributed database, and/or associated caches and servers) configured to store the one or more instructions 1424.

The term "machine readable medium" may include any medium that is capable of storing, encoding, or carrying instructions for execution by the machine and that cause the machine to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 1424 may further be transmitted or received over a communications network 1426 using a transmission medium via the network interface device 1420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1420 may include one or more physical jacks (e.g., Ethernet, coaxial, or phone jacks) or one or more antennas to connect to the communications network 1426. In an example, the network interface device 1420 may include a plurality of antennas to wirelessly communicate using at least one of single-input multiple-output (SIMO), multiple-input multiple-output (MIMO), or multiple-input single-output (MISO) techniques. In some examples, the network interface device 1420 may wirelessly communicate using Multiple User MIMO techniques. The term "transmission medium" shall be taken to include any intangible medium that is capable of storing, encoding or carrying instructions for execution by the machine, and includes digital or analog communications signals or other intangible medium to facilitate communication of such software.

EXAMPLES

Example 1 is an apparatus of an Access Point (AP), the AP comprising transceiver circuitry and processor circuitry that stores a full duplex radio configuration, the AP configured to: receive from a station (STA) a Full Duplex Request To Send (FD-RTS) message that indicates that the STA has a STA message that has message length A to transmit to the AP, the FD-RTS being received during a transmission opportunity (TXOP) obtained by the STA; responsive to reception of the FD-RTS, transmit to the STA a Full Duplex Clear To Send (FD-CTS) message; collaborate with the STA in dynamic adjustment of the full duplex radio configuration to reduce a difference between an expected transmission time of the STA message and an expected transmission time of the AP message; and receive the STA message from the STA and transmit the AP message to the STA, in full duplex communication with the STA during the TXOP.

In Example 2, the subject matter of Example 1 optionally includes wherein the FD-RTS further indicates a transmit power of the STA, and a Self-Interference Cancellation capability of the STA, wherein FD-RTS comprises at least one of an indication of a calculated data rate for the STA, an indication of a calculated transmit power for the STA and an indication that the AP has an AP message to transmit to the STA, the AP message having a message length B; wherein the reception of the STA message is at a given frequency and transmission of the AP message is at the given frequency; and wherein the FD-RTS message is formatted in accordance with one of an IEEE 802.11 family of wireless standards.

In Example 3, the subject matter of any one or more of Examples 1-2 optionally include wherein the transceiver circuitry comprises an AP Medium Access Control (MAC) layer that is configured to implement the collaborative dynamic adjustment via a MAC layer protocol between the AP MAC layer and a MAC layer of the STA and wherein the AP transmits information in accordance with the MAC layer protocol and the transmitted information indicates a message length, a transmit power, a Self-Interference Cancellation capability, and a Modulation and Coding Scheme (MCS).

In Example 4, the subject matter of Example 3 optionally includes wherein, responsive to reception of the FD-RTS, and in accordance with the MAC layer protocol, the AP measures received power from the STA, calculates channel gain between the AP and the STA, and compares message length A and message length B.

In Example 5, the subject matter of Example 4 optionally includes wherein, responsive to a comparison that indicates that message length B is less than message length A, the AP calculates a transmit power of the AP, an MCS for the AP, and an MCS for the STA, that minimizes the difference between an expected transmission time of the STA message and an expected transmission time of the AP message.

In Example 6, the subject matter of any one or more of Examples 1-5 optionally include wherein the difference between the expected transmission time of the STA message and the expected transmission time of the AP message is minimized.

In Example 7, the subject matter of any one or more of Examples 5-6 optionally include wherein the FD-CTS comprises an indication of the calculated MCS for the STA and an indication that the AP has data to transmit to the STA.

In Example 8, the subject matter of Example 7 optionally includes wherein the AP is configured to receive a data frame transmitted at the calculated MCS for the STA and at the transmit power of the STA, and to transmit a data frame at the calculated MCS for the AP and at the calculated transmit power for the AP.

In Example 9, the subject matter of any one or more of Examples 4-8 optionally include wherein, responsive to a calculation that message length B is greater than message length A, the AP calculates a transmit power for the STA, an MCS for the AP, and an MCS for the STA, that minimize the difference between an expected transmission time of the AP message and an expected transmission time of the STA message.

In Example 10, the subject matter of Example 9 optionally includes wherein the FD-CTS comprises an indication of the calculated transmit power for the STA, an indication of the calculated MCS for the STA, and an indication that the AP has data to transmit to the STA.

In Example 11, the subject matter of Example 10 optionally includes wherein the AP is configured to receive a data frame transmitted at the calculated MCS for the STA and at the calculated transmit power of the STA, and to transmit a data frame at the MCS calculated for the AP and at the maximum transmit power of the AP.

Example 12 is aP) that comprises a full duplex radio configuration, causes the AP to: receive from a station (STA) a Full Duplex Request To Send (FD-RTS) message that indicates that the STA has a STA message that has message length A to transmit to the AP, the FD-RTS being received during a transmission opportunity (TXOP) obtained by the STA, the FD-RTS further indicating a transmit power of the STA, and a Self-Interference Cancellation capability of the STA; responsive to receipt of the FD-RTS, transmit to the STA a Full Duplex Clear To Send (FD-CTS) message that comprises at least one of an indication of a calculated Modulation and Coding Scheme (MCS) for the STA, an indication of a calculated transmit power for the STA and an indication that the AP has an AP message that has a message length B to transmit to the STA; collaborate with the STA in dynamically adjustment of the full duplex radio configuration to reduce a difference between an expected transmission time of the STA message and an expected transmission time of the AP message; and receive the STA message from the STA and transmit the AP message to the STA, in full duplex communication with the STA during the TXOP, the receipt of the STA message being at a given frequency and the transmission of the AP message being at the given frequency.

In Example 13, the subject matter of Example 12 optionally includes wherein the FD-RTS message is formatted in accordance with one of an 802.11 family of wireless standards.

In Example 14, the subject matter of any one or more of Examples 12-13 optionally include wherein the AP includes transceiver circuitry that comprises an AP Medium Access Control (MAC) layer that is configured to implement the collaboration in dynamically adjustment via a MAC layer protocol between the AP MAC layer and a MAC layer of the STA.

In Example 15, the subject matter of Example 14 optionally includes wherein the AP transmits information in accordance with the MAC layer protocol and the transmitted information indicates a message length, a transmit power, a Self-Interference Capability, and an MCS.

In Example 16, the subject matter of any one or more of Examples 14-15 optionally include wherein responsive to receiving the FD-RTS, and in accordance with the MAC layer protocol, the one or more processors are configured to measure received power from the STA, calculate channel gain between the AP and the STA, and calculate message length A and message length B.

In Example 17, the subject matter of Example 16 optionally includes wherein, responsive to a comparison that indicates that message length B is less than message length A, the one or more processors are configured to calculate transmit power of the AP, an MCS for the AP, and an MCS for the STA, that minimize the difference between an expected transmission time of the STA message and an expected transmission time of the AP message; wherein the FD-CTS comprises an indication of the calculated MCS for the STA and an indication that the AP has data to transmit to the STA; and wherein the AP is configured to receive a data frame transmitted at the calculated MCS for the STA and at the transmit power of the STA, and to transmit a data frame at the calculated MCS for the AP and at the calculated transmit power for the AP.

In Example 18, the subject matter of any one or more of Examples 16-17 optionally include wherein, responsive to a calculation that message length B is greater than message length A, the one or more processors are configured to calculate a transmit power for the STA, calculate an MCS for the AP, and calculate an MCS for the STA, that minimize the difference between an expected transmission time of the AP message and an expected transmission time of the STA message; wherein the FD-CTS comprises an indication of the calculated transmit power for the STA, an indication of the calculated MCS for the STA, and an indication that the AP has data to transmit to the STA; and wherein the AP is configured to receive a data frame transmitted at the calculated MCS for the STA and at the calculated transmit power of the STA, and to transmit a data frame at the MCS calculated for the AP and at the maximum transmit power of the AP.

In Example 19, the subject matter of any one or more of Examples 12-18 optionally include wherein reception of the STA message is at a given frequency and transmission of the AP message is at the given frequency.

Example 20 is an apparatus of an Access Point (AP), the apparatus comprising transceiver circuitry and processor circuitry that stores a full duplex radio configuration, the apparatus configured to: receive from a first station (STA) a Full Duplex Request To Send (FD-RTS) message that indicates that the first STA has a STA message of message length A to transmit to the AP; responsive to reception of the FD-RTS message, measure received power from the first STA, calculate the channel gain between the first STA and the AP, and transmit a Full Duplex Clear To Send (FD-CTS) message that indicates that the AP does not have data to transmit to the first STA; receive an FD-CTS message from the second STA that indicates calculated channel gain between the first STA and the second STA, and calculated channel gain between the AP and the second STA; transmit a control frame to the first STA that indicates optimal transmit power for the first STA and indicates a calculated MCS for the first STA; receive from the first STA the STA message transmitted at the optimal transmit power of the first STA and at the calculated MCS for the first STA, and transmit to the second STA the AP message at a calculated MCS for the AP and at the AP transmit power, in full duplex communication with the first STA; and upon completion of reception of the STA message and completion of the transmission of the AP message, transmit an acknowledgement packet to the first STA and receive an acknowledgement packet from the second STA.

In Example 21, the subject matter of Example 20 optionally includes wherein the FD-RTS is received during a transmission opportunity (TXOP) obtained by the STA, and the FD-RTS further indicates a transmit power of the first STA, and Self-Interference Capability of the first STA; the FD-CTS further indicates that the AP has an AP message that has message length B to transmit to the second STA, the second FD-CTS further indicating a transmit power of the AP, transmit power of the first STA, a Self-Interference Cancellation capability of the AP, and a calculated channel gain between the first STA and the AP; the AP calculates the optimal transmit power for the first STA, the MCS for the first STA, and the MCS for the AP; the calculated optimal transmit power for the first STA, the calculated MCS for the first STA, and the calculated MCS for the AP reduce a difference between an expected transmission time of the STA message and an expected transmission time of the AP message; and reception of the STA message is at a given frequency and transmission of the AP message is at the given frequency.

Example 22 is a method of full duplex communication of an apparatus of an Access Point (AP), the AP comprising transceiver circuitry and processor circuitry that stores a full duplex radio configuration, the method comprising: receiving from a station (STA) a Full Duplex Request To Send (FD-RTS) message that indicates that the STA has a STA message that has message length A to transmit to the AP, the FD-RTS being received during a transmission opportunity (TXOP) obtained by the STA, the FD-RTS further indicating a transmit power of the STA, and a Self-Interference Capability of the STA; responsive to receiving the FD-RTS, transmitting to the STA a Full Duplex Clear To Send (FD-CTS) message that comprises at least one of an indication of a calculated data rate for the STA, an indication of a calculated transmit power for the STA and an indication that the AP has an AP message to transmit to the STA, the AP message having a message length B; collaborating with the STA in dynamically adjusting the full duplex radio configuration to reduce a difference between an expected transmission time of the STA message and an expected transmission time of the AP message; and receiving the STA message from the STA and transmitting the AP message to the STA, in full duplex communication with the STA during the TXOP, the receiving of the STA message being at a given frequency and the transmitting of the AP message being at the given frequency.

In Example 23, the subject matter of Example 22 optionally includes wherein the transceiver circuitry comprises an AP Medium Access Control (MAC) layer that is configured to implement the collaborating in dynamically adjusting via a MAC layer protocol between the AP MAC layer and a MAC layer of the STA, the AP transmits information in accordance with the MAC layer protocol and the transmitted information indicates a message length, a transmit power, a Self-Interference Capability, and a Modulation and Coding Scheme (MCS).

In Example 24, the subject matter of Example 23 optionally includes wherein responsive to receiving the FD-RTS, and in accordance with the MAC layer protocol, measuring received power from the STA, calculating channel gain between the AP and the STA, and comparing message length A and message length B, and wherein, responsive to a comparing that indicates that message length B is less than message length A, calculating transmit power of the AP, MCS for the AP and MCS, for the STA, that reduces the difference between an expected transmission time of the STA message and an expected transmission time of the AP message.

In Example 25, the subject matter of Example 24 optionally includes wherein, responsive to calculating that message length B is greater than message length A, calculating the transmit power for the STA, the MCS for the AP, and the MCS for the STA, that minimizes the difference between an expected transmission time of the AP message and an expected transmission time of the STA message.

In Example 26, the subject matter can include, or can optionally be combined with any portion or combination of, any portions of any one or more of Examples 1 through 25 to include, subject matter that can include means for performing any one or more of the functions of Examples 1 through 25, or a machine-readable medium including instructions that, when performed by a machine, cause the machine to perform any one or more of the functions of Examples 1 through 25.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B." unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an Access Point (AP), the AP comprising transceiver circuitry that includes an AP Medium Access Control (MAC) layer, and processor circuitry that stores a full duplex radio configuration, the AP being configured to:
   receive from a station (STA), that includes a STA MAC layer, a Full Duplex Request To Send (FD-RTS) message that indicates that the STA has a STA message that has message length A to transmit to the AP, the FD-RTS being received during a transmission opportunity (TXOP) obtained by the STA;
   responsive to reception of the FD-RTS, transmit to the STA a Full Duplex Clear To Send (FD-CTS) message; and
   collaborate with the STA in dynamic adjustment of the full duplex radio configuration to reduce a difference between an expected transmission time of the STA message and an expected transmission time of an AP message,
   wherein
      the AP MAC layer is configured to implement a collaborative dynamic adjustment via a MAC layer protocol between the AP MAC layer and the STA MAC layer, the AP is configured to compare message length A and message length B, responsive to a comparison that indicates that message length B is less than message length A, the AP performs a calculation that minimizes the difference between an expected transmission time of the STA message and an expected transmission time of the AP message, and the AP receives the entire STA message from the STA and transmits the entire AP message to the STA, in full duplex communication with the STA during the TXOP.

2. The apparatus of claim 1 wherein the FD-RTS further indicates a transmit power of the STA, and a Self-Interference Cancellation capability of the STA, wherein FD-RTS comprises at least one of an indication of a calculated data rate for the STA, an indication of a calculated transmit power for the STA or an indication that the AP has an AP message to transmit to the STA, the AP message having a message length B, and wherein the reception of the STA message is at a given frequency and transmission of the AP message is at the given frequency.

3. The apparatus of claim 1 wherein the AP MAC layer transmits information in accordance with the MAC layer protocol, and the transmitted information indicates a message length, a transmit power, a Self-Interference Cancellation capability, and a Modulation and Coding Scheme (MCS).

4. The apparatus of claim 3 wherein, responsive to reception of the FD-RTS, and in accordance with the MAC layer protocol, the AP measures received power from the STA, and calculates channel gain between the AP and the STA.

5. The apparatus of claim 1 wherein, responsive to the comparison that indicates that message length B is less than message length A, the AP calculates a transmit power of the AP, an MCS for the AP, and an MCS for the STA, that minimizes the difference between an expected transmission time of the STA message and an expected transmission time of the AP message.

6. The apparatus of claim 5 wherein the FD-CTS comprises an indication of the calculated MCS for the STA and an indication that the AP has data to transmit to the STA.

7. The apparatus of claim 6 wherein the AP is configured to receive a data frame transmitted at the calculated MCS for the STA and at the transmit power of the STA, and to transmit a data frame at the calculated MCS for the AP and at the calculated transmit power for the AP.

8. The apparatus of claim 4 wherein, responsive to a calculation that message length B is greater than message length A, the AP calculates a transmit power for the STA, an MCS for the AP, and an MCS for the STA, that minimize the difference between an expected transmission time of the AP message and an expected transmission time of the STA message.

9. The apparatus of claim 8 wherein the FD-CTS comprises an indication of the calculated transmit power for the STA, an indication of the calculated MCS for the STA, and an indication that the AP has data to transmit to the STA.

10. The apparatus of claim 9 wherein the AP is configured to receive a data frame transmitted at the calculated MCS for the STA and at the calculated transmit power of the STA, and to transmit a data frame at the MCS calculated for the AP and at the maximum transmit power of the AP.

11. One or more computer-readable hardware storage device having embedded therein a set of instructions which, when executed by one or more processors of an access point (AP) that includes an AP Medium Access Control (MAC) layer and processing circuitry that stores a full duplex radio configuration, causes the AP to:

receive from a station (STA) that includes a STA MAC layer, a Full Duplex Request To Send (FD-RTS) message that indicates that the STA has a STA message that has message length A to transmit to the AP, the FD-RTS being received during a transmission opportunity (TXOP) obtained by the STA;

responsive to reception of the FD-RTS, transmit to the STA a Full Duplex Clear To Send (FD-CTS) message; and collaborate with the STA in dynamic adjustment of the full duplex radio configuration to reduce a difference between an expected transmission time of the STA message and an expected transmission time of an AP message, wherein
the AP MAC layer is configured to implement a collaborative dynamic adjustment via a MAC layer protocol between the AP MAC layer and the STA MAC layer, the AP is configured to compare message length A and message length B and, responsive to a comparison that indicates that message length B is less than message length A, the AP performs a calculation that minimizes the difference between an expected transmission time of the STA message and an expected transmission time of the AP message, and the AP receives the entire STA message from the STA and transmits the entire AP message to the STA, in full duplex communication with the STA during the TXOP.

12. The one or more computer-readable hardware storage device of claim 11 wherein the FD-RTS message is formatted in accordance with one of an 802.11 family of wireless standards.

13. The one or more computer-readable hardware storage device of claim 11 wherein the AP transmits information in accordance with the MAC layer protocol and the transmitted information indicates a message length, a transmit power, a Self-Interference Capability, and an MCS.

14. The one or more computer-readable hardware storage device of claim 11 wherein responsive to receiving the FD-RTS, and in accordance with the MAC layer protocol, the one or more processors are configured to measure received power from the STA, calculate channel gain between the AP and the STA, and calculate message length A and message length B.

15. The one or more computer-readable hardware storage device of claim 14 wherein, responsive to a comparison that indicates that message length B is less than message length A, the one or more processors are configured to calculate transmit power of the AP, an MCS for the AP, and an MCS for the STA, that minimize the difference between an expected transmission time of the STA message and an expected transmission time of the AP message;

wherein the FD-CTS comprises an indication of the calculated MCS for the STA and an indication that the AP has data to transmit to the STA; and wherein the AP is configured to receive a data frame transmitted at the calculated MCS for the STA and at the transmit power of the STA, and to transmit a data frame at the calculated MCS for the AP and at the calculated transmit power for the AP.

16. The one or more computer-readable hardware storage device of claim 14 wherein, responsive to a calculation that message length B is greater than message length A, the one or more processors are configured to calculate a transmit power for the STA, calculate an MCS for the AP, and calculate an MCS for the STA, that minimize the difference between an expected transmission time of the AP message and an expected transmission time of the STA message;
  wherein the FD-CTS comprises an indication of the calculated transmit power for the STA, an indication of the calculated MCS for the STA, and an indication that the AP has data to transmit to the STA; and
  wherein the AP is configured to receive a data frame transmitted at the calculated MCS for the STA and at the calculated transmit power of the STA, and to transmit a data frame at the MCS calculated for the AP and at the maximum transmit power of the AP.

17. A method of full duplex communication of an apparatus of an Access Point (AP), the AP comprising transceiver circuitry that includes an AP Medium Access Control (MAC) layer, and processor circuitry that stores a full duplex radio configuration, the method comprising:
  receiving from a station (STA), that includes a STA MAC layer, a Full Duplex Request To Send (FD-RTS) message that indicates that the STA has a STA message that has message length A to transmit to the AP, the ED-RTS being received during a transmission opportunity (TXOP) obtained by the STA, the FD-RTS further indicating a transmit power of the STA, and a Self-Interference Capability of the STA;
  responsive to receiving the FD-RTS, transmitting to the STA a Full Duplex Clear To Send (FD-CTS) message that comprises at least one of an indication of a calculated data rate for the STA, an indication of a calculated transmit power for the STA or an indication that the AP has an AP message to transmit to the STA, the AP message having a message length B; and
  collaborating with the STA in dynamically adjusting the full duplex radio configuration to reduce a difference between an expected transmission time of the STA message and an expected transmission time of the AP message, wherein
    the AP MAC layer is configured to implement a collaborative dynamic adjustment via a MAC layer protocol between the AP MAC layer and the STA MAC layer,
    the AP is configured to compare message length A and message length B and,
    responsive to a comparison that indicates that message length B is less than message length A, performs a calculation that minimizes the difference between an expected transmission time of the STA message and an expected transmission time of the AP message, and
    the AP receives the entire STA message from the STA and transmits the entire AP message to the STA, in full duplex communication with the STA during the TXOP.

18. The method of claim 17 wherein the AP transmits information in accordance with the MAC layer protocol and the transmitted information indicates a message length, a transmit power, a Self-Interference Capability, and a Modulation and Coding Scheme (MCS).

19. The method of claim 18 wherein responsive to receiving the FD-RTS, and in accordance with the MAC layer protocol, the method further comprises measuring received power from the STA, calculating channel gain between the AP and the STA, and comparing message length A and message length B, and wherein, responsive to a comparing that indicates that message length B is less than message length A, calculating transmit power of the AP MCS for the AP and MCS, for the STA, that reduces the difference between an expected transmission time of the STA message and an expected transmission time of the AP message.

20. The method of claim 19 wherein, responsive to calculating that message length B is greater than message length A, the method further comprises calculating the transmit power for the STA, the MCS for the AP, and the MCS for the STA, that minimizes the difference between an expected transmission time of the AP message and an expected transmission time of the STA message.

* * * * *

UNITED STATES PATENT AND TRADEMARK OFFICE
CERTIFICATE OF CORRECTION

PATENT NO. : 10,218,487 B2
APPLICATION NO. : 14/977373
DATED : February 26, 2019
INVENTOR(S) : Min et al.

Page 1 of 1

It is certified that error appears in the above-identified patent and that said Letters Patent is hereby corrected as shown below:

In the Claims

In Column 24, Line 62, in Claim 1, after "message,", delete "¶"

In Column 26, Line 18, in Claim 11, after "message,", delete "¶"

In Column 27, Line 21, in Claim 17, delete "comp rising:" and insert --comprising:-- therefor In Column 27, Line 25, in Claim 17, delete "ED-RTS" and insert --FD-RTS-- therefor Signed and Sealed this
Eighteenth Day of June, 2019

Andrei Iancu
*Director of the United States Patent and Trademark Office*